US009019989B2

(12) United States Patent
Tatsuta et al.

(10) Patent No.: US 9,019,989 B2
(45) Date of Patent: Apr. 28, 2015

(54) BANDWIDTH ALLOCATION METHOD OF WIRELESSLY TRANSMITTING AV STREAM DATA IN WIRELESS COMMUNICATION SYSTEM INCLUDING COORDINATOR DEVICE

(75) Inventors: Akihiro Tatsuta, Kyoto (JP); Makoto Funabiki, Osaka (JP); Hiroshi Ohue, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 952 days.

(21) Appl. No.: 12/810,075

(22) PCT Filed: Dec. 25, 2008

(86) PCT No.: PCT/JP2008/003952
§ 371 (c)(1),
(2), (4) Date: Jun. 22, 2010

(87) PCT Pub. No.: WO2009/084198
PCT Pub. Date: Jul. 9, 2009

(65) Prior Publication Data
US 2010/0272054 A1    Oct. 28, 2010

(30) Foreign Application Priority Data
Dec. 28, 2007   (JP) .................................. 2007-338794

(51) Int. Cl.
*H04J 3/16* (2006.01)
*H04N 7/16* (2011.01)
*H04N 21/2385* (2011.01)
(Continued)

(52) U.S. Cl.
CPC .................. *H04N 7/165* (2013.01); *H04N 7/08* (2013.01); *H04N 7/087* (2013.01); *H04N 7/084* (2013.01); *H04W 72/048* (2013.01); *H04W 72/04* (2013.01);
(Continued)

(58) Field of Classification Search
None
See application file for complete search history.

(56) References Cited

U.S. PATENT DOCUMENTS 7,298,706 B2    11/2007   Yoshida et al.
7,489,656 B2 *  2/2009   Guo et al. .................... 370/329
(Continued)

FOREIGN PATENT DOCUMENTS

JP    2003-60564    2/2003
JP    2006-270248   10/2006
(Continued)

OTHER PUBLICATIONS

International Preliminary Report on Patentability issued Aug. 19, 2010 in International (PCT) Application No. PCT/JP2008/003952.
(Continued)

*Primary Examiner* — Faruk Hamza
*Assistant Examiner* — Aixa Guadalupe-Cruz
(74) *Attorney, Agent, or Firm* — Wenderoth, Lind & Ponack, L.L.P.

(57) ABSTRACT

In response to a video and audio bandwidth allocation request command signal and an audio bandwidth allocation request command signal from a source device, a coordinator device allocates a first reservation period for transmitting AV stream data from the source device to a sink device and a second reservation period for transmitting audio stream data from the source device to a sink device within a predetermined frame period, and transmits a beacon signal including information on allocation of the first reservation period and the second reservation period.

15 Claims, 18 Drawing Sheets

(51) Int. Cl.
*H04W 72/12* (2009.01)
*H04N 7/08* (2006.01)
*H04N 7/087* (2006.01)
*H04N 7/084* (2006.01)
*H04W 72/04* (2009.01)

(52) U.S. Cl.
CPC ....... *H04N 21/2385* (2013.01); *H04W 72/0453* (2013.01); *H04W 72/121* (2013.01)

(56) References Cited

U.S. PATENT DOCUMENTS

| | | | |
|---|---|---|---|
| 7,499,462 B2* | 3/2009 | MacMullan et al. | 370/401 |
| 7,545,826 B2 | 6/2009 | Sugaya | |
| 8,266,658 B2* | 9/2012 | Funabiki et al. | 725/81 |
| 2003/0060207 A1 | 3/2003 | Sugaya et al. | |
| 2004/0131034 A1 | 7/2004 | Sugaya | |
| 2007/0025262 A1 | 2/2007 | Yoshida et al. | |
| 2007/0064643 A1 | 3/2007 | Tavares | |
| 2007/0107020 A1 | 5/2007 | Tavares | |
| 2008/0013519 A1 | 1/2008 | Kwon et al. | |
| 2009/0161622 A1 | 6/2009 | Sugaya | |

FOREIGN PATENT DOCUMENTS

| | | |
|---|---|---|
| JP | 2007-89151 | 4/2007 |
| JP | 2007-135207 | 5/2007 |
| JP | 2008-511183 | 4/2008 |
| WO | 03/075515 | 9/2003 |

OTHER PUBLICATIONS

International Search Report issued Mar. 31, 2009 in International (PCT) Application No. PCT/JP2008/003952.

High-Definition Multimedia Interface Specification Version 1.3a, Nov. 10, 2006.

* cited by examiner

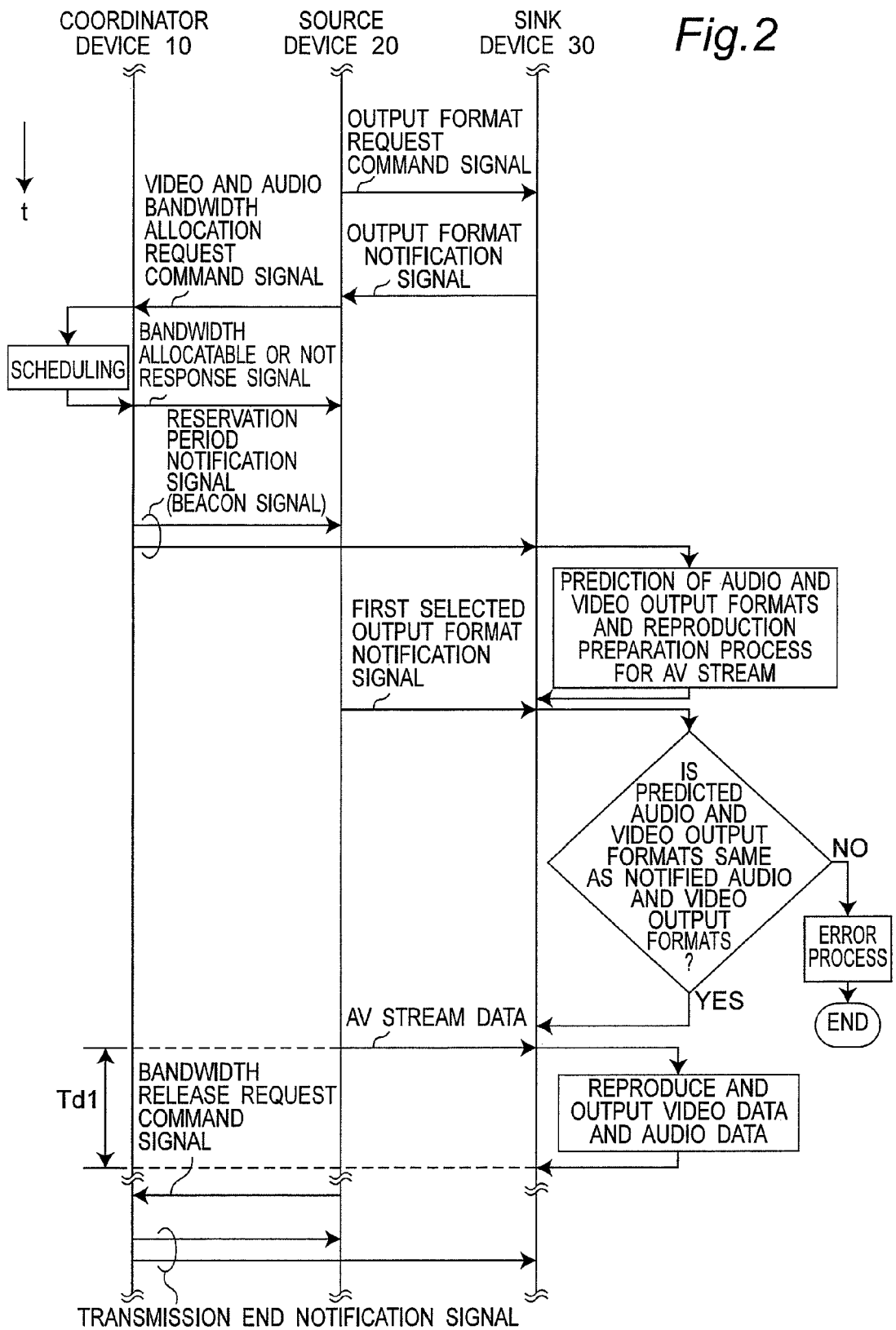

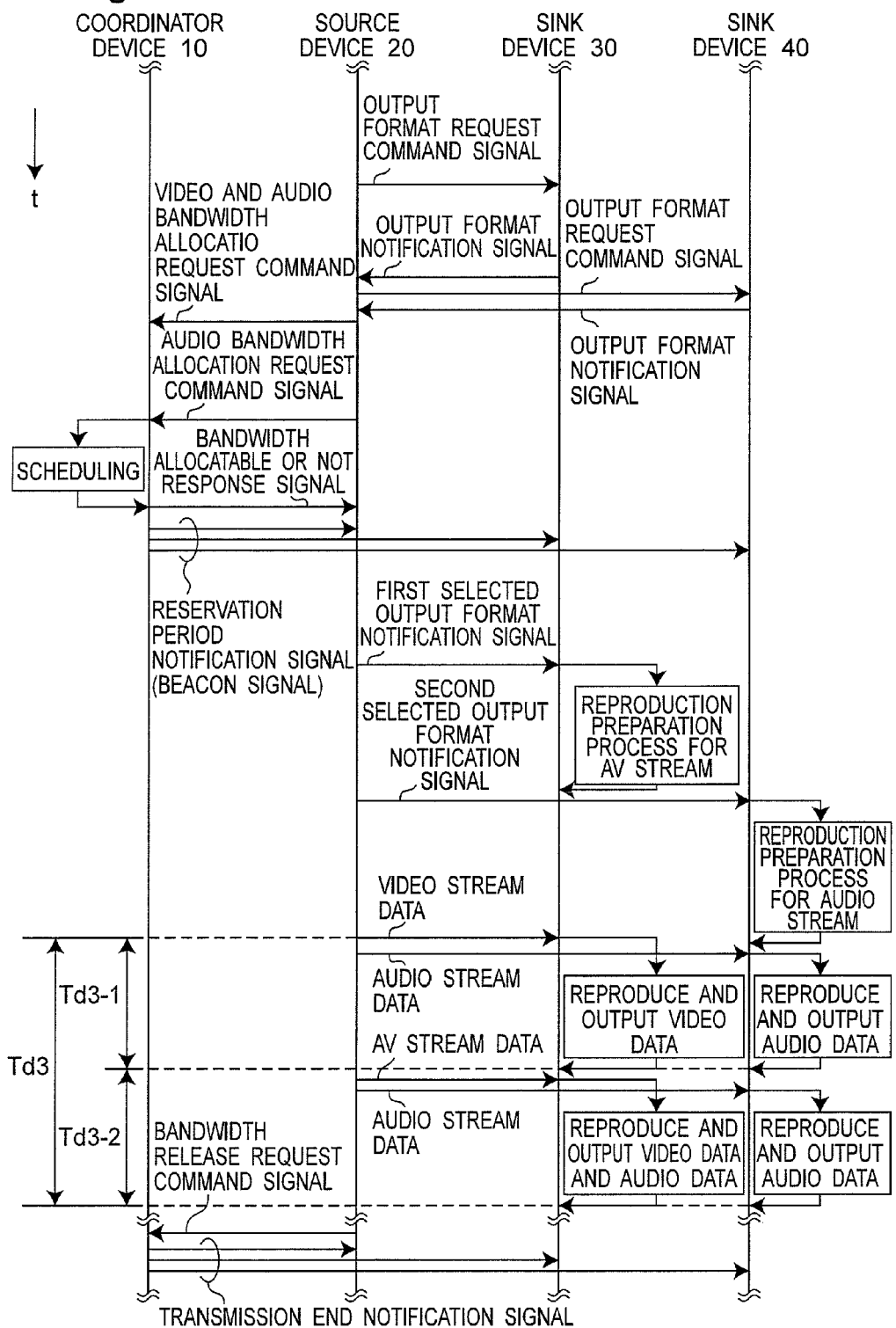

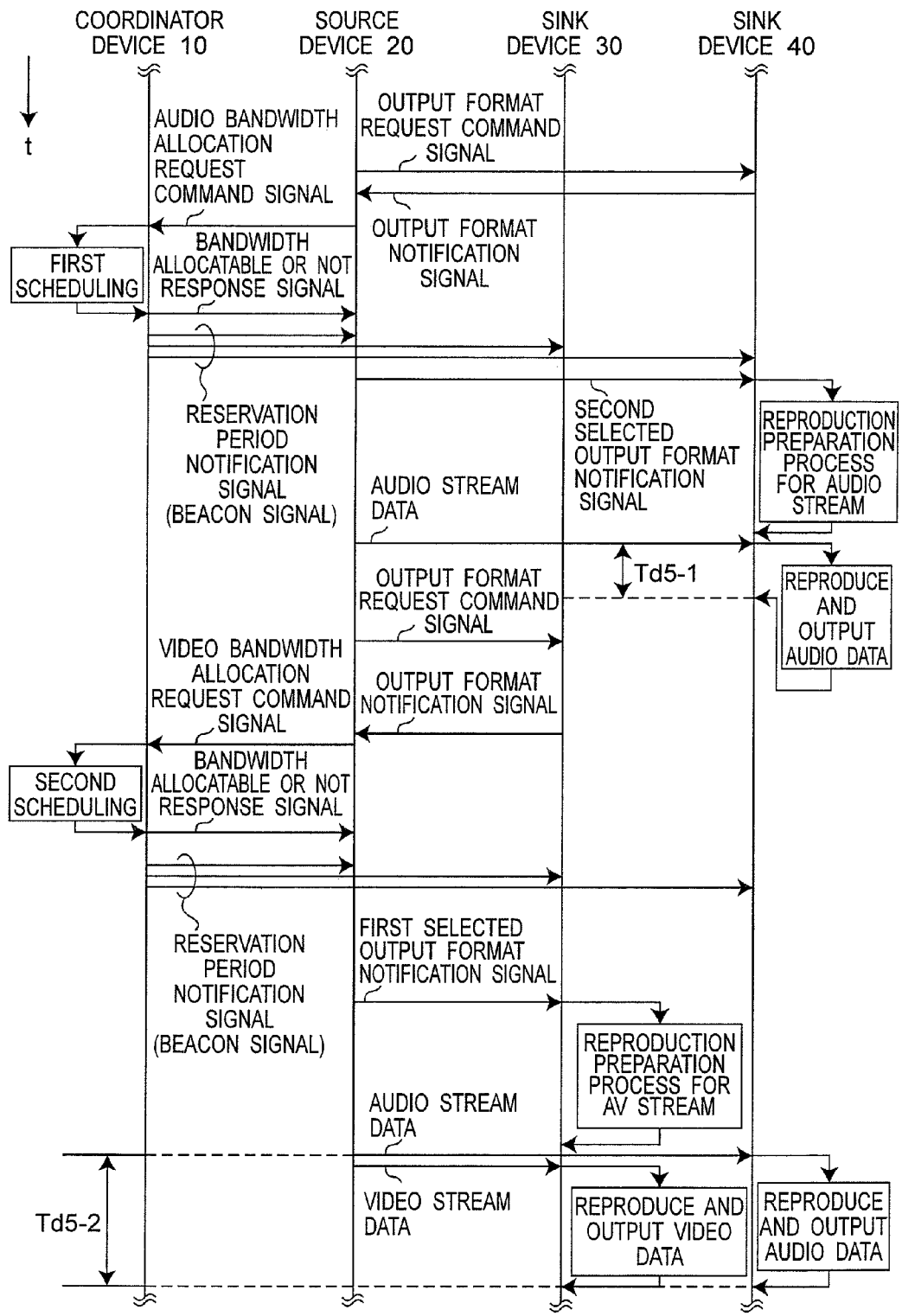

Fig.18

| TIME (μs) | SCHEDULE | PERIOD (μs) | PACKET 1 | | | | | PACKET 2 | | | | | PACKET 3 | | | |
|---|---|---|---|---|---|---|---|---|---|---|---|---|---|---|---|---|
| 0 | BEACON PERIOD Tb (Beacon) | 200 | | | | | | | | | | | | | | |
| 200 | RANDOM ACCESS PERIOD Tr (RATB) | 300 | | | | | | | | | | | | | | |
| 500 | CTB#1 | 675 | V | V | V | V | A | V | V | V | V | A | V | V | V | O | A |
| 1175 | CTB#2 | 675 | V | V | V | V | A | V | V | V | V | A | V | V | V | O | A |
| 1850 | CTB#3 | 675 | V | V | V | V | A | V | V | V | V | A | V | V | V | O | A |
| 2525 | CTB#4 | 675 | V | V | V | V | A | V | V | V | V | A | V | V | V | O | A |
| 3200 | CTB#5 | 675 | V | V | V | V | A | V | V | V | V | A | V | V | V | O | A |
| 3875 | CTB#6 | 675 | V | V | V | V | A | V | V | V | V | A | V | V | V | O | A |
| 4550 | CTB#7 | 675 | V | V | V | V | A | V | V | V | V | A | V | V | V | O | A |
| 5225 | CTB#8 | 675 | V | V | V | V | A | V | V | V | V | A | V | V | V | O | A |
| 5900 | CTB#9 | 675 | V | V | V | V | A | V | V | V | V | A | V | V | V | O | A |
| 6575 | CTB#10 | 675 | V | V | V | V | A | V | V | V | V | A | V | V | V | O | A |
| 7250 | CTB#11 | 675 | V | V | V | V | A | V | V | V | V | A | V | V | V | O | A |
| 7925 | CTB#12 | 675 | V | V | V | V | A | V | V | V | V | A | V | V | V | O | A |
| 8600 | CTB#13 | 675 | V | V | V | V | A | V | V | V | V | A | V | V | V | O | A |
| 9275 | CTB#14 | 675 | V | V | V | V | A | V | V | V | V | A | V | V | V | O | A |
| 9950 | CTB#15 | 600 | RTT OR BEAM SEARCH (Beam search) | | | | | | | | | | | | | |
| 10550 | CTB#16 | 675 | V | V | V | V | A | V | V | V | V | A | V | V | V | O | A |
| 11225 | CTB#17 | 675 | V | V | V | V | A | V | V | V | V | A | V | V | V | O | A |
| 11900 | CTB#18 | 675 | V | V | V | V | A | V | V | V | V | A | V | V | V | O | A |
| 12575 | CTB#19 | 675 | V | V | V | V | A | V | V | V | V | A | V | V | V | O | A |
| 13250 | CTB#20 | 675 | V | V | V | V | A | V | V | V | V | A | V | V | V | O | A |
| 13925 | CTB#21 | 675 | V | V | V | V | A | V | V | V | V | A | V | V | V | O | A |
| 14600 | CTB#22 | 675 | V | V | V | V | A | V | V | V | V | A | V | V | V | O | A |
| 15275 | CTB#23 | 675 | V | V | V | V | A | V | V | V | V | A | V | V | V | O | A |
| 15950 | CTB#24 | 675 | V | V | V | V | A | V | V | V | V | A | V | V | V | O | A |
| 16625 | CTB#25 | 675 | V | V | V | V | A | V | V | V | V | A | V | V | V | O | A |
| 17500 | CTB#26 | 675 | V | V | V | V | A | V | V | V | V | A | V | V | V | O | A |
| 17975 | CTB#27 | 675 | V | V | V | V | A | V | V | V | V | A | V | V | V | O | A |
| 18550 | CTB#28 | 675 | V | V | V | V | A | V | V | V | V | A | V | V | V | O | A |
| 19325 | CTB#29 | 675 | V | V | V | V | A | V | V | V | V | A | V | V | V | O | A |

V INDICATES VIDEO DATA, A INDICATES AUDIO DATA, AND O INDICATES VIDEO DATA V, DEVICE CONTROL DATA AVC OR BEAM TRACKING.

Fig.19

| TIME (μs) | SCHEDULE | PERIOD (μs) | PACKET 1 | PACKET 2 | PACKET 3 |
|---|---|---|---|---|---|
| 0 | BEACON PERIOD Tb (Beacon) | 200 | | | |
| 200 | CTB#1 | 627 | V V V V Rsv | V V V V Rsv | V V V V$_B^{OR}$ Rsv |
| 827 | CTB#2 | 24 | A A A | | |
| 851 | CTB#3 | 627 | V V V V Rsv | V V V V Rsv | V V V V$_B^{OR}$ Rsv |
| 1478 | CTB#4 | 132 | A  A$_B^{OR}$ | A A Rsv Rsv | |
| 1610 | CTB#5 | 627 | V V V V Rsv | V V V V Rsv | V V V V$_B^{OR}$ Rsv |
| 2237 | CTB#6 | 24 | A A A | | |
| 2261 | CTB#7 | 627 | V V V V Rsv | V V V V Rsv | V V V V$_B^{OR}$ Rsv |
| 2888 | CTB#8 | 24 | A A A | | |
| 2912 | CTB#9 | 627 | V V V V Rsv | V V V V Rsv | V V V V$_B^{OR}$ Rsv |
| 3539 | CTB#10 | 132 | A  A$_B^{OR}$ | A A Rsv Rsv | |
| 3671 | CTB#11 | 627 | V V V V Rsv | V V V V Rsv | V V V V$_B^{OR}$ Rsv |
| 4298 | CTB#12 | 24 | A A A | | |
| 4322 | CTB#13 | 627 | V V V V Rsv | V V V V Rsv | V V V V$_B^{OR}$ Rsv |
| 4949 | CTB#14 | 24 | A A A | | |
| 4973 | CTB#15 | 627 | V V V V Rsv | V V V V Rsv | V V V V$_B^{OR}$ Rsv |
| 5600 | CTB#16 | 132 | A  A$_B^{OR}$ | A A Rsv Rsv | |
| 5732 | CTB#17 | 627 | V V V V Rsv | V V V V Rsv | V V V V$_B^{OR}$ Rsv |
| 6359 | CTB#18 | 24 | A A A | | |
| 6383 | CTB#19 | 627 | V V V V Rsv | V V V V Rsv | V V V V$_B^{OR}$ Rsv |
| 7010 | CTB#20 | 24 | A A A | | |
| 7034 | CTB#21 | 627 | V V V V Rsv | V V V V Rsv | V V V V$_B^{OR}$ Rsv |
| 7661 | CTB#22 | 132 | A  A$_B^{OR}$ | A A Rsv Rsv | |
| 7793 | CTB#23 | 627 | V V V V Rsv | V V V V Rsv | V V V V$_B^{OR}$ Rsv |
| 8420 | CTB#24 | 24 | A A A | | |
| 8444 | CTB#25 | 627 | V V V V Rsv | V V V V Rsv | V V V V$_B^{OR}$ Rsv |
| 9071 | CTB#26 | 24 | A A A | | |
| 9095 | CTB#27 | 627 | V V V V Rsv | V V V V Rsv | V V V V$_B^{OR}$ Rsv |
| 9722 | CTB#28 | 132 | A  A$_B^{OR}$ | A A Rsv Rsv | |
| 9854 | CTB#29 | 492 | RTT OR BEAM SEARCH (Beam search) | | |

V INDICATES VIDEO DATA, A INDICATES AUDIO DATA, RSV INDICATES RESERVED, AND B INDICATES BEAM TRACK.

Fig.20

| TIME (μs) | SCHEDULE | PERIOD (μs) | PACKET 1 | | | | | PACKET 2 | | | | | PACKET 3 | | | | |
|---|---|---|---|---|---|---|---|---|---|---|---|---|---|---|---|---|---|
| 10346 | CTB#30 | 627 | V | V | V | V | Rsv | V | V | V | V | Rsv | V | V | V | V OR B | Rsv |
| 10973 | CTB#31 | 24 | A | A | A | | | | | | | | | | | | |
| 10997 | CTB#32 | 627 | V | V | V | V | Rsv | V | V | V | V | Rsv | V | V | V | V OR B | Rsv |
| 11624 | CTB#33 | 132 | A | A OR B | | | | A | A | Rsv | Rsv | | | | | | |
| 11756 | CTB#34 | 627 | V | V | V | V | Rsv | V | V | V | V | Rsv | V | V | V | V OR B | Rsv |
| 12383 | CTB#35 | 24 | A | A | A | | | | | | | | | | | | |
| 12407 | CTB#36 | 627 | V | V | V | V | Rsv | V | V | V | V | Rsv | V | V | V | V OR B | Rsv |
| 13034 | CTB#37 | 24 | A | A | A | | | | | | | | | | | | |
| 13058 | CTB#38 | 627 | V | V | V | V | Rsv | V | V | V | V | Rsv | V | V | V | V OR B | Rsv |
| 13685 | CTB#39 | 132 | A | A OR B | | | | A | A | Rsv | Rsv | | | | | | |
| 13817 | CTB#40 | 627 | V | V | V | V | Rsv | V | V | V | V | Rsv | V | V | V | V OR B | Rsv |
| 14444 | CTB#41 | 24 | A | A | A | | | | | | | | | | | | |
| 14468 | CTB#42 | 627 | V | V | V | V | Rsv | V | V | V | V | Rsv | V | V | V | V OR B | Rsv |
| 15095 | CTB#43 | 24 | A | A | A | | | | | | | | | | | | |
| 15119 | CTB#44 | 627 | V | V | V | V | Rsv | V | V | V | V | Rsv | V | V | V | V OR B | Rsv |
| 15746 | CTB#45 | 132 | A | A OR B | | | | A | A | Rsv | Rsv | | | | | | |
| 15878 | CTB#46 | 627 | V | V | V | V | Rsv | V | V | V | V | Rsv | V | V | V | V OR B | Rsv |
| 16505 | CTB#47 | 24 | A | A | A | | | | | | | | | | | | |
| 16529 | CTB#48 | 627 | V | V | V | V | Rsv | V | V | V | V | Rsv | V | V | V | V OR B | Rsv |
| 17156 | CTB#49 | 24 | A | A | A | | | | | | | | | | | | |
| 17180 | CTB#50 | 627 | V | V | V | V | Rsv | V | V | V | V | Rsv | V | V | V | V OR B | Rsv |
| 17807 | CTB#51 | 132 | A | A OR B | | | | A | A | Rsv | Rsv | | | | | | |
| 17939 | CTB#52 | 627 | V | V | V | V | Rsv | V | V | V | V | Rsv | V | V | V | V OR B | Rsv |
| 18566 | CTB#53 | 24 | A | A | A | | | | | | | | | | | | |
| 18590 | CTB#54 | 627 | V | V | V | V | Rsv | V | V | V | V | Rsv | V | V | V | V OR B | Rsv |
| 19217 | CTB#55 | 24 | A | A | A | | | | | | | | | | | | |
| 19241 | CTB#56 | 627 | V | V | V | V | Rsv | V | V | V | V | Rsv | V | V | V | V OR B | Rsv |
| 19868 | CTB#57 | 132 | A | A OR B | | | | A | A | Rsv | Rsv | | | | | | |

V INDICATES VIDEO DATA, A INDICATES AUDIO DATA, RSV INDICATES RESERVED, AND B INDICATES BEAM TRACKING.

BANDWIDTH ALLOCATION METHOD OF WIRELESSLY TRANSMITTING AV STREAM DATA IN WIRELESS COMMUNICATION SYSTEM INCLUDING COORDINATOR DEVICE

TECHNICAL FIELD

The present invention relates to a bandwidth (band) allocation method for use in a wireless communication system and a wireless communication system using the bandwidth allocation method. In particular, the present invention relates to a bandwidth allocation method and a wireless communication system using the method, where the method is provided for AV stream data wirelessly transmitted from a source device to at least one sink device in the wireless communication network including the source device and at least one sink device, which are audio and video devices (referred to as AV devices hereinafter), respectively.

BACKGROUND ART

In recent years, many digital AV devices such as DVD players, digital set-top boxes, digital television broadcasting receivers and AV amplifiers are used in, for example, homes. In order to make it possible to freely set up these digital AV devices at arbitrary locations in a home and to transmit contents from one of the AV devices to the other AV devices, there is proposed a technique for wirelessly connecting a plurality of AV devices via a wireless network.

FIG. 15 is a block diagram showing an example of an IEEE 802.15.3 network using an UWB (Ultra Wide Band) according to a prior art. Referring to FIG. 15, devices 101 to 104 are components of the IEEE 803.15.3 network, and form one piconet 100. In this case, the device 101 is referred to as a piconet coordinator (PNC), and functions as a master device of the piconet 100.

In addition, FIG. 16 is a timing chart showing an example of a bandwidth allocation method for packet communication in the piconet 100 of FIG. 15. In the packet communication in the piconet 100, a frame format called super frame is used. Referring to FIG. 16, each super frame has a super frame period Tsf. Further, each super frame is constituted, from top, by three periods of a beacon period Tb, a contention access period (CAP) Tcap, and a contention free period (CFP) Tcfp. Each of the three periods includes at least one time slot having a predetermined time period. In this case, the beacon period Tb is secured in order to transmit a beacon signal from the device 101 of the PNC to the other devices 102 to 104. In the beacon period Tb, the device 101 generates a beacon signal, which includes control data for synchronizing start timings of super frames for the devices 101 to 104 with one another and control data such as data related to time slots for transmission of data among the devices 101 to 104, and transmits the beacon signal to the devices 102 to 104. In addition, the contention access period Tcap is used so that the devices 101 to 104 transmit asynchronous data to the entire piconet 100. Further, the contention free period Tcfp includes a plurality of time slots and is used to transmit data between one source device and at least one sink device selected from among the devices 101 to 104.

FIG. 17 is a sequence diagram showing a method of transmitting AV stream data in the piconet 100 of FIG. 15. Referring to FIG. 17, the device 103 of a source device (referred to as a source device 103 hereinafter) transmits AV stream data to the device 102 of a sink device (referred to as a sink device 102 hereinafter). First of all, the source device 103 acquires data on a plurality of video output formats and audio output fat mats of video and audio, which the sink device 102 can receive and reproduce, from the sink device 102. For example, when the sink device 102 is a digital television broadcasting receiver, the source device 103 acquires the data on a plurality of video output formats and audio output formats of video and audio, which the digital television broadcasting receiver can receive and reproduce, by previously reading out EDID (Extended Display Identification Data) stored in the sink device 102. Next, the source device 103 selects a video output format and an audio output format of AV stream data transmitted to the sink device 102 from among the acquired video output formats and audio output formats. Then, the source device 103 requests the device 101 of the PNC to reserve a bandwidth required to transmit the AV stream data to the sink device 102 based on the selected respective formats. In response to this, the device 101 performs a time slot allocation process (also referred to as a scheduling) for transmitting the AV stream data from the source device 103 to the sink device 102, and notifies the source device 103 of data on allocated time slots using a beacon signal. Then, the source device 103 transmits a signal for notifying the sink device 102 of the selected video output format and audio output format to the sink device 102, and transmits the AV stream data to the sink device 102 at timings of the notified time slots. Finally, each of the source device 103 and the sink device 102 requests the device 101 to release the reserved bandwidth. In response to this, the device 101 notifies the source device 103 and the sink device 102 of control data indicating an end of transmission of the AV stream data using a beacon signal. As described above, in the IEEE 802.15.3 network, the AV stream data can be transmitted from the source device 103 to the sink device 102. For example, Patent Document 1 and Non-Patent Document 1 describe other methods of transmitting AV stream data.

Patent Document 1: Japanese patent laid-open publication No. JP-2006-270248-A.
Non-Patent Document 1: High-Definition Multimedia Interface Specification Version 1.3a, November 2006.

DISCLOSURE OF THE INVENTION

Technical Problem

However, the method of transmitting the AV stream data in the piconet 100 according to the prior art shown in FIG. 17 has the following problem. After receiving the notification of the video output format and the audio output format from the source device 103, the sink device 102, which is, for example, the digital television broadcasting receiver, executes a reproduction preparation process such as a setting of audio output sampling and a setting of video output format to be executed before receiving the AV stream data. Therefore, total required time from a timing when the source device 103 transmits the AV stream data to the sink device 102 to a timing when the sink device 102 reproduces contents of the AV stream data is relatively long.

Further, when the source device 103 is to transmit the AV stream data to a plurality of sink devices 102 and 104 simultaneously, the source device 103 cannot transmit the AV stream data to the sink devices 102 and 104 simultaneously since a bandwidth allocation method for the transmission is not defined.

It is a first object of the present invention to provide a bandwidth allocation method for use in a wireless communication system and the wireless communication system capable of solving the above-stated problems and capable of transmitting AV stream data from one source device to a plurality of sink devices substantially simultaneously.

It is a second object of the present invention to provide a bandwidth allocation method for use in a wireless communication system and the wireless communication system capable of solving the above stated problems and capable of reducing total required time since a source device transmits AV stream data to a sink device until the sink device reproduces contents of the AV stream data, as compared with the prior art.

Solution to Problem

According to the first aspect of the present invention, there is provided a bandwidth allocation method for use in a wireless communication system. The wireless communication system wirelessly transmits one of (a) first stream data including video and audio data and (b) second stream data including video data from a source device to a first sink device, and wirelessly transmits third stream data including audio data from the source device to a second sink device, where the wireless communication system includes bandwidth management means for managing bandwidth for wireless transmission. The source device transmits a first bandwidth allocation request signal for requesting allocation of a bandwidth for transmitting the first stream data to the first sink device, to the bandwidth management means. The source device transmits a second bandwidth allocation request signal for requesting allocation of a bandwidth for transmitting the third stream data to the second sink device, to the bandwidth management means. In response to the first and second bandwidth allocation request signals, the bandwidth management means allocates a first reservation period for transmitting the first stream data from the source device to the first sink device and a second reservation period for transmitting the third stream data from the source device to the second sink device within a predetermined frame period, and transmits a beacon signal including information on allocation of the first and second reservation periods.

In the above-mentioned bandwidth allocation method for use in the wireless communication system, after receiving the beacon signal including the information on the allocation, the source device transmits the second stream data to the first sink device for an allocated first reservation period, and transmits the third stream data to the second sink device for an allocated second reservation period.

In addition, in the above-mentioned bandwidth allocation method for use in the wireless communication system, after receiving the beacon signal, the source device transmits one stream data of the first and second stream data to the first sink device for the first reservation period allocated within the frame period, and transmits another stream data of the first and second stream data to the first sink device for the first reservation period allocated within a next frame period next to the frame period.

Further, in the above-mentioned bandwidth allocation method for use in the wireless communication system, the bandwidth management means divides the first reservation period into two periods, and allocates the second reservation period between divided two periods.

Still further, in the above-mentioned bandwidth allocation method for use in the wireless communication system, the bandwidth management means divides the first reservation period into a plurality of first divided periods, divides the second reservation period into a plurality of second divided periods, and allocates the respective first divided periods and the respective second divided periods within the frame period so that the first divided periods and the second divided periods are located alternately with each other.

In addition, in the above-mentioned bandwidth allocation method for use in the wireless communication system, the source device transmits the first bandwidth allocation request signal to the bandwidth management means. In response to the first bandwidth allocation request signal, the bandwidth management means allocates the first reservation period within the predetermined frame period, and transmits a first beacon signal including information on allocation of the first reservation period. After receiving the first beacon signal, the source device transmits the first stream data to the first sink device for the first reservation period within the frame period, and thereafter, transmits the second bandwidth allocation request signal to the bandwidth management means. In response to the second bandwidth allocation request signal, the bandwidth management means further allocates the second reservation period within a next frame period next to the frame period, and transmits a second beacon signal including information on allocation of the second reservation period. After receiving the second beacon signal, the source device transmits the second stream data to the first sink device for an allocated first reservation period, and transmits the third stream data to the second sink device for an allocated second reservation period.

Further, in the above-mentioned bandwidth allocation method for use in the wireless communication system, the source device transmits the second bandwidth allocation request signal to the bandwidth management means. In response to the second bandwidth allocation request signal, the bandwidth management means allocates the second reservation period within the predetermined frame period, and transmits a first beacon signal including information on allocation of the second reservation period. After receiving the second beacon signal, the source device transmits the third stream data to the second sink device for the second reservation period within the frame period, and thereafter, transmits the first bandwidth allocation request signal to the bandwidth management means. In response to the first bandwidth allocation request signal, the bandwidth management means further allocates the first reservation period within a next frame period next to the frame period, and transmits a second beacon signal including information on allocation of the first reservation period. After receiving the second beacon signal, the source device transmits the second stream data to the first sink device for the allocated first reservation period, and transmits the third stream data to the second sink device for the allocated second reservation period.

According to the second aspect of the present invention, there is provided a bandwidth allocation method for use in a wireless communication system. The wireless communication system wirelessly transmits stream data including video and audio data from a source device to a sink device, and includes bandwidth management means for managing bandwidth for wireless transmission. The sink device includes a storage device for storing data on a plurality of output formats therein. The source device receives an output format notification signal including the data on the plurality of output formats transmitted from the sink device, selects output formats for outputting the video and audio data via the sink device from among received plurality of output formats, and thereafter, transmits a bandwidth allocation request signal to the bandwidth management means. The bandwidth allocation request signal is provided for requesting allocation of a bandwidth for transmitting the stream data including video and audio data having selected output formats to the sink device. In response to the bandwidth allocation request signal, the bandwidth management means transmits a beacon signal including information on a reservation period for transmitting the stream data from the source device to the sink device. The sink device predicts the selected output formats by comparing the information on the reservation period included in the beacon signal with stored plurality of output formats.

In the above-mentioned bandwidth allocation method for use in the wireless communication system, in response to the beacon signal, the source device transmits a selected output format notification signal including the selected output formats to the sink device. Before receiving the selected output format notification signal from the source device, the sink device performs a preparation process for outputting the video and audio data based on predicted output formats.

In addition, in the bandwidth allocation method for use in the wireless communication system, the wireless communication network includes a plurality of sink devices. In response to a plurality of bandwidth allocation request signals for requesting a plurality of bandwidth for transmitting a plurality of stream data from the source device to the plurality of sink devices, respectively, the bandwidth management means allocates a plurality of reservation periods for transmitting the plurality of stream data from the source device to the plurality of sink devices, respectively, within a predetermined frame period, and transmits a beacon signal including information on allocation of the plurality of reservation periods, respectively.

According to the third aspect of the present invention, there is provided a wireless communication system for wirelessly transmitting one of (a) first stream data including video and audio data and (b) second stream data including video data from a source device to a first sink device, and for wirelessly transmitting third stream data including audio data from the source device to a second sink device. The wireless communication system includes bandwidth management means for managing bandwidth for wireless transmission. The source device transmits a first bandwidth allocation request signal for requesting allocation of a bandwidth for transmitting the first stream data to the first sink device, to the bandwidth management means. The source device transmits a second bandwidth allocation request signal for requesting allocation of a bandwidth for transmitting the third stream data to the second sink device, to the bandwidth management means. In response to the first and second bandwidth allocation request signals, the bandwidth management means allocates a first reservation period for transmitting the first stream data from the source device to the first sink device and a second reservation period for transmitting the third stream data from the source device to the second sink device within a predetermined frame period, and transmits a beacon signal including information on allocation of the first and second reservation periods.

In the above-mentioned wireless communication system, after receiving the beacon signal including the infomaation on the allocation, the source device transmits the second stream data to the first sink device for an allocated first reservation period, and transmits the third stream data to the second sink device for an allocated second reservation period.

In addition, in the above-mentioned wireless communication, after receiving the beacon signal, the source device transmits one stream data of the first and second stream data to the first sink device for the first reservation period allocated within the frame period, and transmits another stream data of the first and second stream data to the first sink device for the first reservation period allocated within a next frame period next to the frame period.

Further, in the above-mentioned wireless communication system, the bandwidth management means divides the first reservation period into two periods, and allocates the second reservation period between divided two periods.

Still further, in the above-mentioned wireless communication system, the bandwidth management means divides the first reservation period into a plurality of first divided periods, divides the second reservation period into a plurality of second divided periods, and allocates the respective first divided periods and the respective second divided periods within the frame period so that the first divided periods and the second divided periods are located alternately with each other.

In addition, in the above-mentioned wireless communication system, the source device transmits the first bandwidth allocation request signal to the bandwidth management means. In response to the first bandwidth allocation request signal, the bandwidth management means allocates the first reservation period within the predetermined frame period, and transmits a first beacon signal including information on allocation of the first reservation period. After receiving the first beacon signal, the source device transmits the first stream data to the first sink device for the first reservation period within the frame period, and thereafter, transmits the second bandwidth allocation request signal to the bandwidth management means. In response to the second bandwidth allocation request signal, the bandwidth management means further allocates the second reservation period within a next frame period next to the frame period, and transmits a second beacon signal including information on allocation of the second reservation period. After receiving the second beacon signal, the source device transmits the second stream data to the first sink device for an allocated first reservation period, and transmits the third stream data to the second sink device for an allocated second reservation period.

Further, in the above-mentioned wireless communication system, the source device transmits the second bandwidth allocation request signal to the bandwidth management means. In response to the second bandwidth allocation request signal, the bandwidth management means allocates the second reservation period within the predetermined frame period, and transmits a first beacon signal including information on allocation of the second reservation period. After receiving the second beacon signal, the source device transmits the third stream data to the second sink device for the second reservation period within the frame period, and thereafter, transmits the first bandwidth allocation request signal to the bandwidth management means. In response to the first bandwidth allocation request signal, the bandwidth management means further allocates the first reservation period within a next frame period next to the frame period, and transmits a second beacon signal including information on allocation of the first reservation period. After receiving the second beacon signal, the source device transmits the second stream data to the first sink device for the allocated first reservation period, and transmits the third stream data to the second sink device for the allocated second reservation period.

According to the fourth aspect of the present invention, there is provided a wireless communication system for system wirelessly transmitting stream data including video and audio data from a source device to a sink device, the wireless communication system includes bandwidth management means for managing bandwidth for wireless transmission. The sink device includes a storage device for storing data on a plurality of output formats therein. The source device receives an output format notification signal including the data on the plurality of output formats transmitted from the sink device, selects output formats for outputting the video and audio data via the sink device from among received plurality of output formats, and thereafter, transmits a bandwidth allocation request signal to the bandwidth management means, the bandwidth allocation request signal is provided for requesting allocation of a bandwidth for transmitting the stream data including video and audio data having selected output formats to the sink device. In response to the bandwidth allocation request signal, the bandwidth management means transmits a beacon signal including information on a reservation period for transmitting the stream data from the source device to the sink device. The sink device predicts the selected output formats by comparing the information on the reservation period included in the beacon signal with stored plurality of output formats.

In the above-mentioned wireless communication system, in response to the beacon signal, the source device transmits a selected output format notification signal including the selected output formats to the sink device. Before receiving the selected output format notification signal from the source device, the sink device performs a preparation process for outputting the video and audio data based on predicted output formats.

In addition, in the above-mentioned wireless communication system, the wireless communication network includes a plurality of sink devices. In response to a plurality of bandwidth allocation request signals for requesting a plurality of bandwidth for transmitting a plurality of stream data from the source device to the plurality of sink devices, respectively, the bandwidth management means allocates a plurality of reservation periods for transmitting the plurality of stream data from the source device to the plurality of sink devices, respectively, within a predetermined frame period, and transmits a beacon signal including information on allocation of the plurality of reservation periods, respectively.

Advantageous Effects of the Invention

According to the bandwidth allocation method for use in the wireless communication system according to the first invention and the wireless communication system according to the third invention, a source device transmits a first bandwidth allocation request signal for requesting allocation of a bandwidth for transmitting a first stream data including audio and video data to the first sink device, and a second bandwidth allocation request signal for requesting allocation of a bandwidth for transmitting a second stream data including audio data to the second sink device, to the bandwidth management means. In response to the first and second bandwidth allocation request signals, the bandwidth management means allocates a first reservation period for transmitting the first stream data from the source device to the first sink device and a second reservation period for transmitting the second stream data from the source device to the second sink device within a predetermined frame period, and transmits a beacon signal including information on allocation of the first and second reservation periods. Therefore, one source device can transmit the first and second stream data to the first and second sink devices substantially simultaneously. In addition, as compared with the prior art, it is possible to reduce a transmission time difference between transmission of the first stream data from the source device to the first sink device and transmission of the second stream data from the source device to the second sink device.

In addition, according to the bandwidth allocation method for use in the wireless communication system according to the second invention and the wireless communication system according to the fourth invention, a source device receives an output format notification signal including data on a plurality of output formats transmitted from a sink device, selects output formats for outputting video and audio data via the sink device from among received plurality of output formats, and thereafter, transmits a bandwidth allocation request signal to bandwidth management means. The bandwidth allocation request signal is transmitted for requesting allocation of a bandwidth for transmitting stream data including video and audio data having selected output formats to the sink device. In response to this, the bandwidth management means transmits a beacon signal including information on a reservation period for transmitting the stream data from the source device to the sink device. Further, the sink device predicts the selected output formats by comparing the information on the reservation period included in the beacon signal with stored plurality of output formats. Therefore, as compared with the prior art, it is possible to reduce a total required time since the source device transmits the stream data to the sink device until the sink device reproduces contents of the stream data.

BRIEF DESCRIPTION OF DRAWINGS

FIG. 2 is a sequence diagram showing the bandwidth allocation method for AV stream data according to the first embodiment of the present invention.

FIG. 6 is a sequence diagram showing a bandwidth allocation method for AV stream data according to a third embodiment of the present invention.

FIG. 13 is a sequence diagram showing a bandwidth allocation method for AV stream data according to a seventh embodiment of the present invention.

FIG. 18 is a table according to the first embodiment of the present invention, the table showing an example of concrete numeric values for bandwidth allocation in a super frame when a source device 20 transmits AV stream data to a sink device 30.

FIG. 19 is a diagram showing a first part of a table according to the fifth embodiment of the present invention, the table showing an example of concrete numeric values for bandwidth allocation in a super frame when the source device 20 transmits video stream data to the sink device 30 and the source device 20 transmits audio stream data to a sink device 40.

FIG. 20 is a diagram showing a second part of the table according to the fifth embodiment of the present invention, the table showing an example of concrete numeric values for the bandwidth allocation in the super frame when the source device 20 transmits video stream data to the sink device 30 and the source device 20 transmits audio stream data to the sink device 40.

REFERENCE SIGNS LIST

Figure 1:
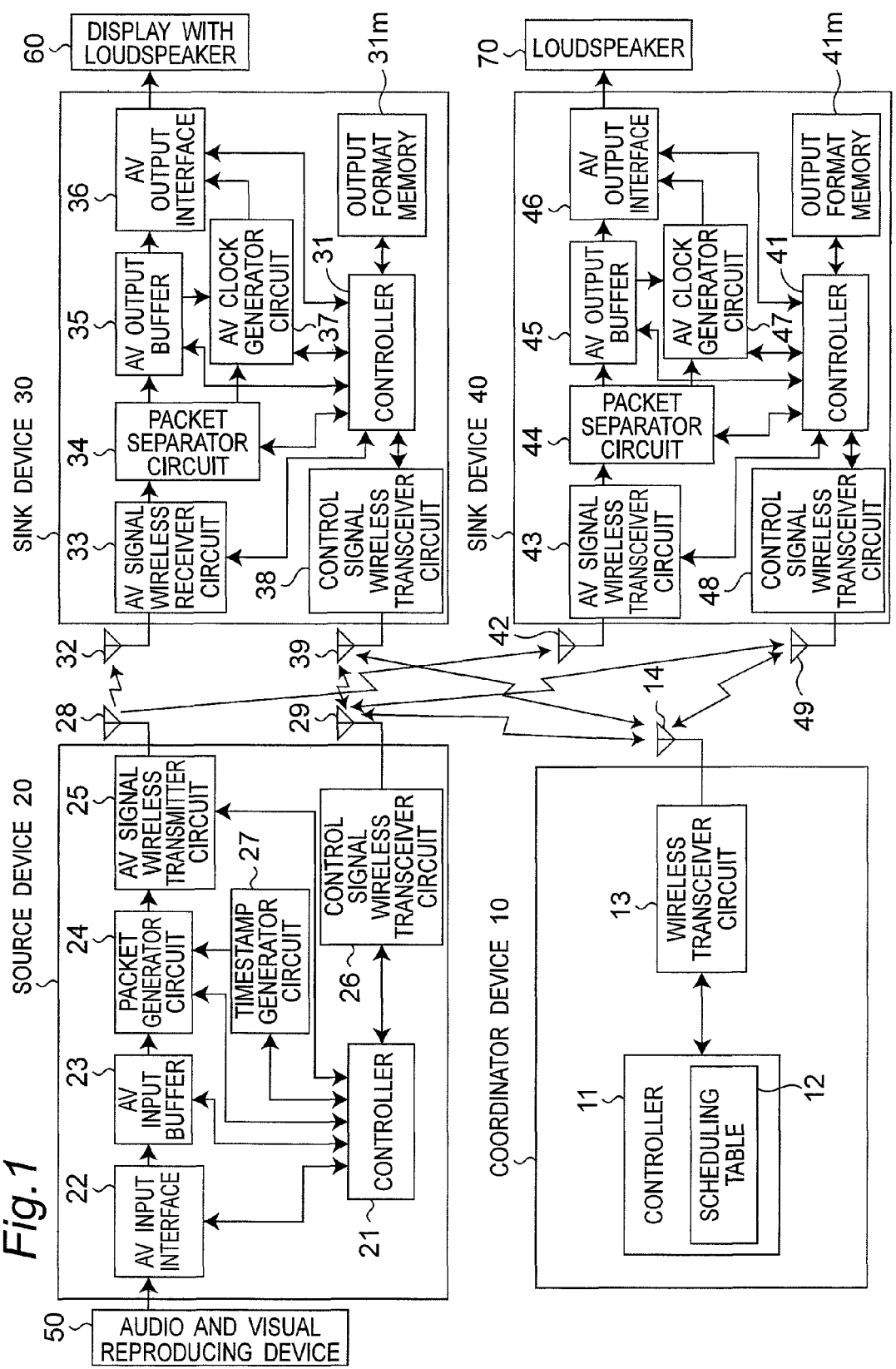
FIG. 1 is a block diagram showing a configuration of a wireless communication system for transmitting a wireless signal including AV stream data using a bandwidth allocation method for AV stream data according to a first embodiment of the present invention.

10 . . . Coordinator Device,
11, 21, 31, and 41 . . . Controller,
12 . . . Scheduling Table,
13 . . . Wireless Transceiver Circuit,
14, 28, 29, 32, 39, 42, and 49 . . . Antenna,
20 . . . Source Device,
22 . . . AV Input Interface,
23 . . . AV Input Buffer,
24 . . . Packet Generator Circuit,
25 . . . AV Signal Wireless Transmitter Circuit,
26 . . . Control Signal Wireless Transceiver Circuit,
27 . . . Timestamp Generator Circuit,
31m, 41m . . . Output Format Memory,
33 and 43 . . . AV Signal Wireless Receiver Circuit,
34 and 44 . . . Packet Separator Circuit,
35 and 45 . . . AV Output Buffer,
36 and 46 . . . AV Output Interface,
37 and 47 . . . AV Clock Generator Circuit,
38 and 48 . . . Control Signal Wireless Transceiver Circuit,
50 . . . Audio and Visual Reproducing Device,
60 . . . Display With Loudspeaker,
70 . . . Loudspeaker,
S1 to SN . . . Time Slot,
Ta and Tav . . . Reservation Period,
Tb . . . Beacon Period,
Tr . . . Random Access Period, and
Tsf . . . Super Frame Period.

BEST MODE FOR CARRYING OUT THE INVENTION

Embodiments of the present invention will be described hereinafter with reference to the drawings. In the embodiments, components similar to each other are denoted by the same reference numerals.

First Embodiment

Figure 3A:
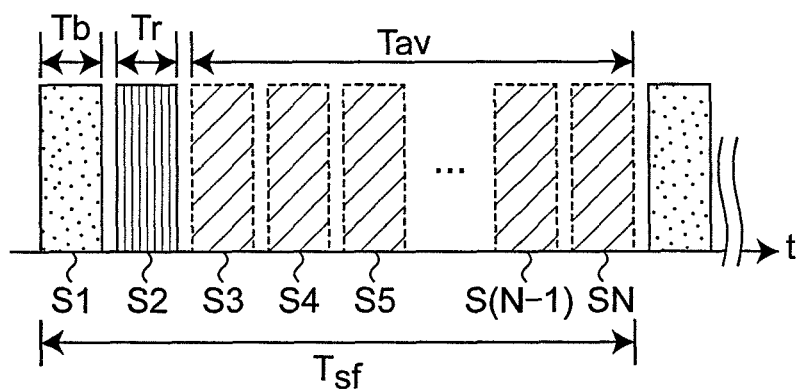
FIG. 3A is a timing chart showing the bandwidth allocation method for AV stream data according to the first embodiment of the present invention.
Figure 3B:
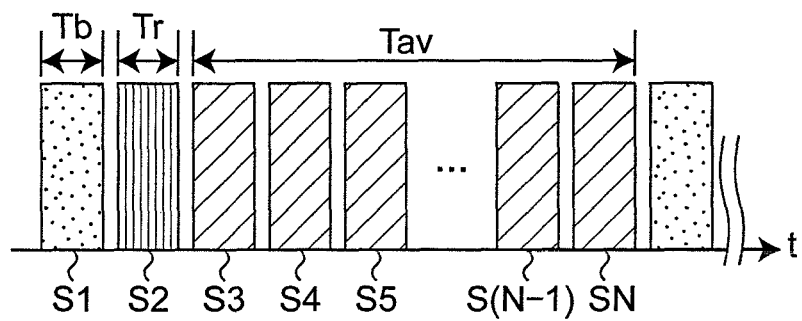
FIG. 3B is a timing chart showing a state of transmitting the AV stream data in a data transmission period Td1 of FIG. 2.

FIG. 1 is a block diagram showing a configuration of a wireless communication system for transmitting a wireless signal including AV stream data using a bandwidth allocation method for AV stream data according to a first embodiment of the present invention, and FIG. 2 is a sequence diagram showing the bandwidth allocation method for AV stream data according to the first embodiment of the present invention. In addition, FIG. 3A is a timing chart showing the bandwidth allocation method for AV stream data according to the first embodiment of the present invention, and FIG. 3B is a timing chart showing a state of transmitting the AV stream data in a data transmission period Td1 of FIG. 2. It is to be noted that the configuration of the wireless communication system of FIG. 1 is applied to first to seventh embodiments.

In this case, the bandwidth allocating method according to the first embodiment and the wireless communication system using the method are characterized as follows. A source device 20 receives an output format notification signal including data on a plurality of video and audio output formats (output specifications) transmitted from a sink device 30, selects output formats for outputting video and audio data via the sink device 30 from among the received plurality of video and audio output formats, and thereafter, transmits a video and audio bandwidth allocation request command signal to a coordinator device 10. The video and audio bandwidth allocation request command signal is transmitted for requesting allocation of a bandwidth for transmitting AV stream data including the video and audio data having the selected video and audio output formats to the sink device 30. In response to the video and audio bandwidth allocation request command signal, the coordinator device 10 transmits a beacon signal including information on a reservation period Ta for transmitting the AV stream data from the source device to the sink device 30. The sink device 30 predicts the selected video and audio output formats by comparing the information on the reservation period Ta included in the beacon signal with a plurality of video and audio output formats stored in an output format memory 31m.

Further, the bandwidth allocating method according to the first embodiment and the wireless communication system using the method are characterized as follows. In response to the beacon signal including the information on the reservation period Ta, the source device 20 transmits a first selected output format notification signal including the selected output formats to the sink device 30. The sink device 30 performs a reproduction preparation process for outputting the video and audio data based on the predicted output formats before receiving the first selected output format notification signal from the source device.

First of all, referring to FIG. 1, there will be described configurations of the coordinator device 10, the source device 20 and sink devices 30 and 40 connected to each other via a wireless communication line for a wireless network, and operations of the coordinator device 10, the source device 20 and the sink devices 30 and 40.

Referring to FIG. 1, the source device 20 is connected to an audio and visual reproducing device 50 of, for example, a DVD player via an HDMI (High Definition Multimedia Interface) cable, which is a digital data transmission bus compliant with HDMI Standard. The source device 20 wirelessly transmits AV stream data including video and audio data from the audio and visual reproducing device 50 or video stream data including only video data, to the sink device 30. In addition, the source device 20 wirelessly transmits audio stream data including only audio data to the sink device 40. In addition, the sink device 30 is connected to a display with loudspeaker 60 via an HDMI cable, and outputs the video and audio data included in the received AV stream data or the video data included in the received video stream data to the display with loudspeaker 60. On the other hand, the sink device 40 is connected to a loudspeaker 70 via an HDMI cable, and outputs the audio data included in the received audio stream data to the loudspeaker 70. Further, the coordinator device 10 makes bandwidth management for wireless transmission between the source device 20 and each of the sink devices 30 and 40.

In addition, referring to FIG. 1, the coordinator device 10, which is bandwidth management means, is configured to include a controller 11 including a scheduling table 12, a wireless transceiver circuit 13, and an antenna 14. After being received by the antenna 14, a wireless signal transmitted from an antenna 29 of the source device 20, a wireless signal transmitted from an antenna 39 of the sink device 30, and a wireless signal transmitted from an antenna 49 of the sink device 40 are inputted to the wireless transceiver circuit 13. In this case, the wireless signal from the source device 20 includes, for example, the video and audio bandwidth allocation request command signal for requesting allocation of a bandwidth required to transmit the AV stream data from the source device 20 to the sink device 30, an audio bandwidth allocation request command signal for requesting allocation of a bandwidth required to transmit the audio stream data from the source device 20 to the sink device 40, and a bandwidth release request command signal for requesting release of the allocated bandwidth. Each of the wireless signals from the sink devices 30 and 40 includes the bandwidth release request command signal for requesting release of the allocated bandwidth and the like. The wireless transceiver circuit 13 demodulates the inputted wireless signals into digital signals, and outputs the digital signals to the controller 11.

In the coordinator device 10, the controller 11 includes the scheduling table 12 which includes data on types of the respective devices 20, 30 and 40 in the wireless communication network, and data on a plurality of video output formats and a plurality of audio output formats of the sink devices 30 and 40. In this case, each of the types represents a sink device or a source device. In response to, for example, the video and audio bandwidth allocation request command signal from the source device 20, the controller 11 performs a process (also referred to as a scheduling) for allocating a bandwidth required to transmit the AV stream data, with referring to the scheduling table 12. In addition, in response to the audio bandwidth allocation request signal from the source device 20, the controller 11 performs a process for allocating the bandwidth required to transmit the audio stream data with referring to the scheduling table 12. The bandwidth allocation process performed by the coordinator device 10 will be described later in detail. Next, the controller 11 generates a beacon signal including a bandwidth allocatable or not response signal representing whether or not the scheduling can be performed, and outputs the beacon signal to the wireless transceiver circuit 13. When the scheduling can be performed, the controller 11 generates a beacon signal including a reservation period notification signal including information on the allocated bandwidth, and outputs the beacon signal to the wireless transceiver circuit 13. After performing a predetermined bandwidth release process in response to the bandwidth release request command signal, the controller 11 generates a beacon signal including a transmission end notification signal for notifying end of the data transmission, and outputs the beacon signal to the wireless transceiver circuit 13. The wireless transceiver circuit 13 modulates a wireless carrier signal into a digital wireless signal according to the respective inputted beacon signals, and wirelessly transmits the wireless signal after the modulation toward the antenna 29 of the source device 20, the antenna 39 of the sink device 30 and the antenna 49 of the sink device 40 via the antenna 14.

In addition, referring to FIG. 1, the source device 20 is configured to include an AV input interface 22, an AV input buffer 23, a packet generator circuit 24, an AV signal wireless transmitter circuit 25, a control signal wireless transceiver circuit 26, a timestamp generator circuit 27, a controller 21 for controlling operations of these devices or circuits 22 to 26, and antennas 28 and 29. In this case, the audio and visual reproducing device 50 connected to the source device 20 reproduces video and audio data from a recording medium such as a DVD, and outputs the reproduced video and audio data to the packet generator circuit 24 via the AV input interface 22 and the AV input buffer 23. Further, the packet generator circuit 24 converts timing values, which indicates transmission timings of packets and outputted from the timestamp generator circuit 27, and the video data and the audio data into a digital signal in a predetermined packet format, and outputs the digital signal to the AV signal wireless transceiver circuit 25. The AV signal wireless transceiver circuit 25 modulates a wireless carrier signal into a digital wireless signal according to the inputted digital signal, and wirelessly transmits the wireless signal after the modulation toward an antenna 32 of the sink device 30 and an antenna 42 of the sink device 40 via the antenna 28. In this case, the wireless signal outputted from the AV signal wireless transmitter circuit 25 includes at least one of the AV stream data wirelessly transmitted to the sink device 30, the video stream data wirelessly transmitted to the sink device 30, and the audio stream data wirelessly transmitted to the sink device 40, as described later in detail.

In addition, as described later in detail, the controller 21 of the source device 20 generates the video and audio bandwidth allocation request command signal, the audio bandwidth allocation request command signal, and the bandwidth release request command signal, and outputs the same signals to the control signal wireless transceiver circuit 26. In response to this, the control signal wireless transceiver circuit 26 modulates a wireless carrier signal into a digital wireless signal according to the inputted signals, and wirelessly transmits the wireless signal after the modulation toward the antenna 14 of the coordinator circuit 10 via the antenna 29. Further, the controller 21 generates an output format request command signal for inquiring of the sink device 30 about a plurality of video output formats of video data and a plurality of audio output formats of audio data (referred to as video and audio output formats hereinafter) outputted from the sink device 30 to the display with loudspeaker 60, the output format request command signal for inquiring of the sink device 40 about a plurality of audio output formats of audio outputted from the sink device 40 to the loudspeaker 70, the first selected output format notification signal for notifying the sink device 30 of a format of the AV stream data transmitted to the sink device 30, and a second selected output format notification signal for notifying the sink device 40 of a format of the audio stream data transmitted to the sink device 40. In addition, the controller 21 outputs the output format request command signals, the first selected output format notification signal and the second selected output format notification signal to the control signal wireless transceiver circuit 26. In response to this, the control signal wireless transceiver circuit 26 modulates a wireless carrier signal into a digital wireless signal according to the inputted signals, and wirelessly transmits the wireless signal after the modulation toward the antenna 39 of the sink device 30 or the antenna 49 of the sink device 40 via the antenna 29. On the other hand, the wireless signal transmitted from the antenna 14 of the coordinator device 10 and the wireless signals transmitted from the antennas 39 and 49 of the sink devices 30 and 40, respectively, are received by the antenna 29, and thereafter, inputted to the control signal wireless transceiver circuit 26. In this case, the wireless signal transmitted from the coordinator device 10 via the antenna 14 includes the beacon signal including the bandwidth allocatable or not response signal, the reservation period notification signal or the transmission end notification signal. The wireless signal transmitted from the sink device 30 via the antenna 39 includes the output format notification signal including the data on a plurality of video output formats of the video data and a plurality of audio output formats of the audio data outputted from the sink device 30 to the display with loudspeaker 60. The wireless signal transmitted from the sink device 40 via the antenna 49 includes the output format notification signal including the data on a plurality of audio output formats of the audio data outputted from the sink device 40 to the loudspeaker 70.

Referring to FIG. 1, the sink device 30 is configured to include an AV signal wireless receiver circuit 33, a packet separator circuit 34, an AV output buffer 35, an AV output interface 36, an AV clock generator circuit 37, a control signal wireless transceiver circuit 38, a controller 31 for controlling operations of these devices or circuits 33 to 38, the output format memory 31m, and the antennas 32 and 39.

In this case, the output format memory 31m stores therein the following video output formats v1, v2 and v3, and audio output formats s1 and s2 as output formats (output specifications) of the video data and the audio data to be outputted to the display with loudspeaker 60.

In this case, the video output format v1 has a 1080p image output method (1920 horizontal active pixels, 1080 vertical active pixels, and progressive scanning), a field frequency of 60 Hz, and a 24-bit color expression method. The video output format v2 has a 720p image output method (1280 horizontal active pixels, 720 vertical active pixels, and the progressive scanning), a field frequency of 60 Hz, and the 24-bit color expression method. In addition, the video output format v3 has a 480p image output method (720 horizontal active pixels, 480 vertical active pixels, and the progressive scanning), a field frequency of 60 Hz, and the 24-bit color expression method.

In addition, the audio output format s1 has two audio channels, 16 quantization bits, a sample rate of 48 kHz, and a linear PCM AD conversion method. The audio output format s2 has eight audio channels, 24 quantization bits, a sample rate of 192 kHz, and the linear PCM AD conversion method.

Referring to FIG. 1, the wireless signal transmitted from the antenna 28 of the source device 20 is received by the antenna 32, and thereafter, inputted to the AV signal wireless receiver circuit 33. After demodulating the received wireless signal into a digital wireless signal, the AV signal wireless receiver circuit 33 outputs the digital wireless signal to the packet separator circuit 34. The packet separator circuit 34 separates the inputted digital signal into the video and audio data and data on the timing values indicating the packet transmission timings, by a predetermined packet process. In addition, the packet separator circuit 34 outputs the former video and audio data to the AV output buffer 35, and outputs the latter data on the timing values to the AV clock generator circuit 37. The AV clock generator circuit 37 reproduces clocks for the AV stream data in the source device 20 based on the inputted data on the timing values so as to generate an AV clock signal, and outputs the video and audio data in the AV output buffer 35 to the display with loudspeaker 60 via the AV output interface 36 according to the AV clock signal. After executing a predetermined signal process on the inputted video and audio data, the display with loudspeaker 60 outputs the processed video data to a display so as to display images, and outputs the processed audio data to the loudspeaker.

In addition, in the sink device 30 of FIG. 1, the wireless signal, which includes the bandwidth allocatable or not response signal transmitted from the antenna 14 of the coordinator device 10, the beacon signal including the reservation period notification signal or the transmission end notification signal, the output format request command signal transmitted from the antenna 28 of the source device 20, or the first selected output format notification signal transmitted from the antenna 28 of the source device 20, is received by the antenna 39, and thereafter, inputted to the control signal wireless transceiver circuit 38. After demodulating the received wireless signal into a digital signal, the control signal wireless transceiver circuit 38 outputs the digital signal to the controller 31. Upon receiving the output fox mat request command signal from the source device 20, the controller 31 generates the output format notification signal including the data on the video output formats v1, v2 and v3 and the audio output formats s1 and s2 stored in the output format memory 31m, and outputs the output format notification signal to the control signal wireless transceiver circuit 38. In response to this, the control signal wireless transceiver circuit 38 modulates a wireless carrier signal into a digital wireless signal according to the inputted signal, and wirelessly transmits the wireless signal after the modulation toward the antenna 29 of the source device 20 via the antenna 39. In addition, when the source device 20 completes the transmission of the stream data, the controller 31 generates the bandwidth release request command signal, and outputs the bandwidth release request command signal to the control signal wireless transceiver circuit 38. In response to this, the control signal wireless transceiver circuit 38 modulates a wireless carrier signal into a digital wireless signal according to the inputted signal, and wirelessly transmits the wireless signal after the modulation to the antenna 14 of the coordinator device 10 via the antenna 39.

Referring to FIG. 1, the sink device 40 is configured to include an AV signal wireless receiver circuit 43, a packet separator circuit 44, an AV output buffer 45, an AV output interface 46, an AV clock generator circuit 47, a control signal wireless transceiver circuit 48, a controller 41 for controlling operations of these devices or circuits 43 to 48, an output format memory 41m, and the antennas 42 and 49. The sink device 40 operates in a manner similar to that of the sink device 30, however, differently from the sink device 30, the sink device 40 outputs only audio data to the loudspeaker 70, and the output format memory 41m stores therein the following audio output formats a1, a2, a3 and a4 as output formats of sound outputted to the loudspeaker 70.

In this case, the audio output format a1 has two audio channels, 16 quantization bits, a sample rate of 48 kHz, and the linear PCM AD conversion method. The audio output format a2 has eight audio channels, 24 quantization bits, a sample rate of 192 kHz, and the linear PCM AD conversion method.

In addition, the audio output format a3 has a Dolby Digital Plus audio format, and the audio output format a4 has a Digital Theater System (DTS) audio format.

Next, referring to FIGS. 1, 2, 3A and 3B, there will be described the bandwidth allocation method for AV stream data according to the first embodiment when the AV stream data is transmitted from the source device 20 to the sink device 30. In the present embodiment and the following embodiments, objects of the coordinator device 10, the source device 20 and the sink devices 30 and 40 performing operations are the controllers 11, 21, 31 and 41, respectively, however, descriptions of the controllers 11, 21, 31 and 41 are omitted below.

Figure 16:
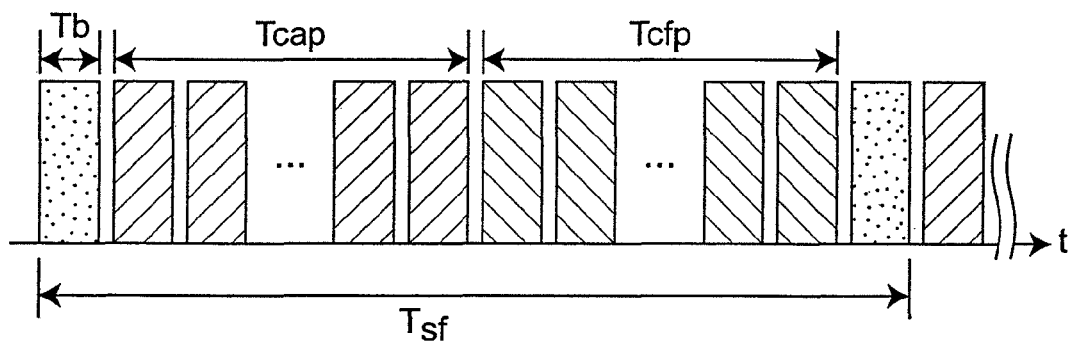
FIG. 16 is a timing chart showing an example of a bandwidth allocation method for packet communication in the piconet 100 of FIG. 15.
Figure 17:
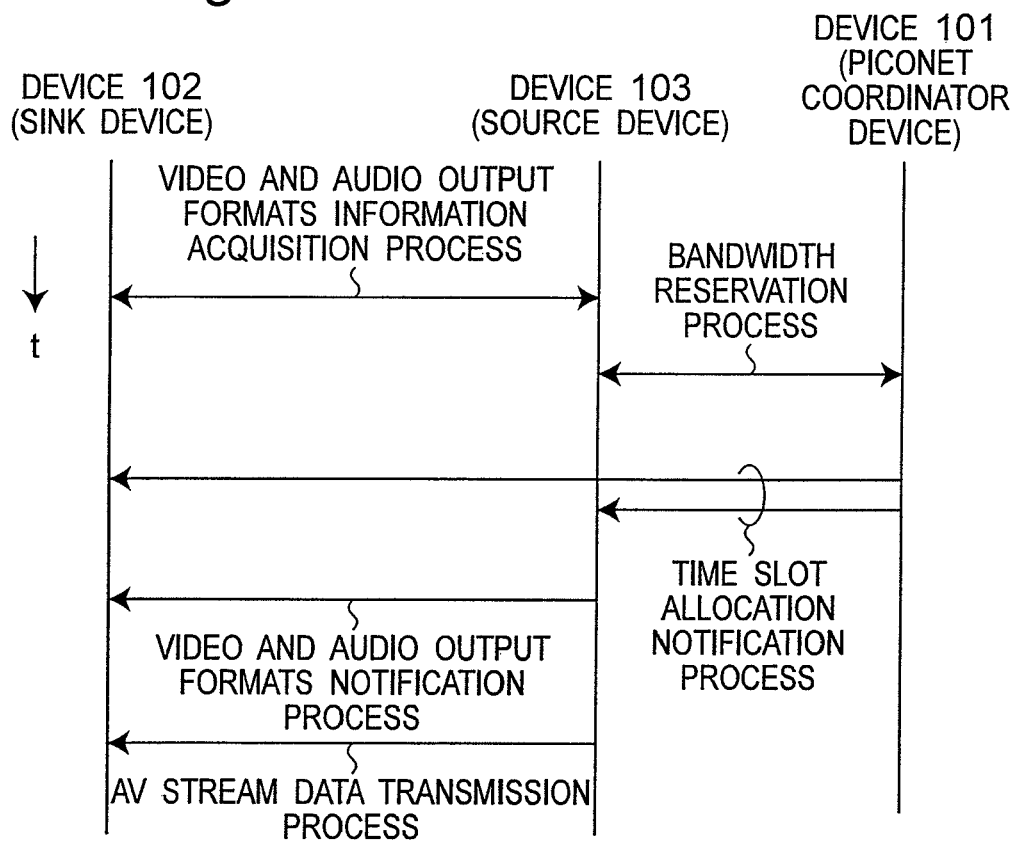
FIG. 17 is a sequence diagram showing an example of a method of transmitting AV stream data in the piconet 100 of FIG. 15.

In a packet communication in the wireless communication network of FIG. 1, a frame format called super frame is used. Referring to FIG. 3A, each super frame has a predetermined super frame period Tsf, and includes a plurality of time slots S1, S2, . . . and SN each having a predetermined time period and a predetermined bandwidth amount. Further, each super frame is constituted, from top, by three periods of a beacon period Tb including the time slot S1 for transmitting a beacon signal from the coordinator device 10, a random access period Tr corresponding to the contention access period Tcap (See FIG. 16) in the piconet and including the time slot S2, and a reservation period Tav including a plurality of time slots S3 to SN for transmitting AV stream data from the source device 20 to the sink device 30.

Referring to FIG. 2, first of all, in order to request the sink device 30 to transmit a plurality of video and audio output formats of video and audio data to be outputted from the sink device 30 to the display with loudspeaker 60, the source device 20 transmits the output format request command signal to the sink device 30 for the random access period Tr. In response to this, the sink device 30 transmits the output fog mat notification signal, which includes the data on the video output formats v1, v2 and v3 and the audio output formats s1 and s2, to the source device 20 for the random access period Tr. In response to this, the source device 20 selects one video output format from among the video output formats v1, v2 and v3, and selects one audio output format from among the audio output formats s1 and s2. Then, the source device 20 calculates a bandwidth amount required to transmit AV stream data having the selected video output format and audio output format based on the selected output formats. For example, when the source device 20 selects the video output format v1 and the audio output format s1, a bandwidth amount required to transmit video data having the video output format v1 is about 3.732 Gbps (=1920×1080×60×24), and a bandwidth amount required to transmit audio data having the audio output format s1 is about 2 Mbps (=48000×2× 16). Therefore, the bandwidth amount required to transmit the AV stream data is about 3.734 Gbps. Further, the source device 20 calculates the number of allocated time slots required to transmit the AV stream data based on the calculated required bandwidth amount and a bandwidth amount of each time slot. Then, the source device 20 transmits the video and audio bandwidth allocation request command signal, which includes information on the source device 20 of a originating device, information on the sink device 30 of a destination device, and the calculated number of allocated time slots to the coordinator device 10, for the random access period Tr.

Referring to FIG. 2, upon receiving the video and audio bandwidth allocation request command signal from the source device 20, the coordinator device 10 allocates the reservation period Tav required to transmit the AV stream data from the source device 20 to the sink device 30 within the frame period Tsf as shown in FIG. 3A, and transmits the bandwidth allocatable or not response signal representing whether or not the reservation period Tav is allocatable, to the source device 20. Further, when the reservation period Tav is allocatable, the coordinator device 10 transmits the reservation period notification signal including information on allocation of the reservation period Tav to all of the devices in the wireless communication network using a beacon signal. In this case, the information on the allocation of the reservation period Tav includes information on the number of time slots S3 to SN included in the reservation period Tav within the super frame period Tsf, information on a leading time slot, information on periods of the time slots S3 to SN, respectively, and information on a period of a schedule.

Upon receiving the reservation period notification signal, the sink device 30 calculates a bandwidth amount of the allocated reservation period Tav, compares the calculated bandwidth amount with respective bandwidth amounts in transmission required to transmit video data having the video output formats v1, v2 and v3, respectively, bandwidth amounts in transmission required to transmit audio data having the audio output formats s1 and s2, respectively, so as to search a combination of a video output format and an audio output format having a total bandwidth amount in transmission closest to the calculated bandwidth amount, and predicts that AV stream data having the searched video output format and audio output format will be transmitted from the source device 20. Further, the sink device 30 performs a reproduction preparation process for AV stream such as a setting of audio output sampling to be executed before receiving the AV stream data and a setting of video output formats based on the predicted video and audio output formats. It is to be noted that the sink device 30 performs the reproduction preparation process for AV stream before receiving the first selected output format notification signal from the source device 20 to be described below.

On the other hand, upon receiving the reservation period notification signal, the source device 20 transmits the first selected output format notification signal for notifying the sink device 30 of the selected video and audio output formats to the sink device 30 for the random access period Tr. In response to this, the sink device 30 determines whether or not the predicated video and audio output formats notification is the same as the notified video and audio output formats. If YES, the sink device 30 awaits the AV stream data from the source device 20. If NO, the sink device 30 executes a predetermined error process and completes a process for receiving the AV stream data.

After transmitting the first selected output format notification signal, the source device 20 transmits AV stream data 10 to the sink device 30. In this case, for the data transmission period Td1 of FIG. 2, the source device 20 transmits the AV stream data to the sink device 30 using the time slots S3 to SN indicated by solid lines within the reservation period Tav of FIG. 3B. Further, the sink device 30 reproduces the video and audio data from the received AV stream data, and outputs the reproduced video and audio data to the display with loudspeaker 60.

After the transmission of the AV stream data from the source device 20 to the sink device 30 ends, each of the source device 20 and the sink device 30 transmits the bandwidth release request command signal to the coordinator device 10 for the random access period Tr. In response to this, the coordinator device 10 performs the predetermined bandwidth release process and transmits a beacon signal including the transmission end notification signal to all of the devices in the wireless communication network.

FIG. 18 is a table according to the first embodiment of the present invention, the table showing an example of concrete numeric values for bandwidth allocation in a super frame when the source device 20 transmits AV stream data to the sink device 30. As shown in FIG. 18, a length of the super frame period Tsf is 20 ms, a length of the beacon period Tb (Beacon) is 200 µm, and a length of the random access period Tr (RATB) is 300 µm. Further, referring to FIG. 18, the time slots for transmitting the AV stream data from the source device 20 to the sink device 30 are shown by time slots CTB#1 to CTB#29. It is to be noted that the time slot CTB#15 is used for data RTT (Round Trip Time: packet round trip delay time) for copyright protection of contents transmitted between the source device 20 and the sink device 30 or Beam search, which is first data for adjusting the antennas of the source device 20 and the antennas of the sink device 30. In addition, in each of periods of the time slots CTB#1 to CTB#14 and CTB#16 to CTB#29, it is possible to transmit three mixture packets of packets 1 to 3. In this case, in each of the periods of the time slots CTB#1 to CTB#14 and CTB#16 to CTB#29, the packet 1 includes video data V and audio data A, and the packet 2 includes video data V and audio data A. In each of the periods of the time slots CTB#1 to CTB#14 and CTB#16 to CTB#29, the packet 3 includes video data V and audio data A, and also includes video data V, device control data AVC or Beam track which is second data for adjusting the antennas.

As described above in detail, according to the bandwidth allocation method according to the present embodiment and the wireless communication system using the method, when the sink device 30 receives the reservation period notification signal from the coordinator device 10, the sink device 30 predicts the video and audio output formats of AV stream data from the source device 20, and performs the reproduction preparation process for AV stream data based on the predicted video and audio output formats before receiving the first selected output format notification signal from the source device 20. Therefore, when the sink device 30 receives the first selected output format notification signal from the source device 20, the sink device 30 has already completed the reproduction preparation process. Therefore, according to the AV stream data bandwidth allocation method according to the present embodiment, it is possible to reduce total required time from the timing when the source device transmits the AV stream data to the sink device to the timing when the sink device reproduces the content of the AV stream data, as compared with the prior art.

In the present embodiment, the source device 20 transmits the AV stream data to the sink device 30, and transmits the audio stream data to the sink device 40, however, the present invention is not limited to this. The source device 20 may transmit AV stream data, video stream data or audio stream data to each of three or more sink devices. In this case, the source device 20 transmits a plurality of bandwidth allocation request signals each requesting a bandwidth for transmitting each stream data from the source device to each of the plurality of sink devices, to the coordinator device 10. In response to this, the coordinator device 10 allocates a plurality of reservation periods for transmitting the stream data from the source device 20 to the plural sink devices, respectively, within the super frame period Tsf, and transmits a beacon signal including allocation information.

In addition, each pair of the antennas 28 and 29, the antennas 32 and 39, and the antennas 42 and 49 are configured separately from each other in FIG. 1, however, the present invention is not limited to this. Each pair of the antennas 28 and 29, the antennas 32 and 39, and the antennas 42 and 49 may be configured integrally.

Further, the video output formats v1, v2 and v3 include 1080p, 720p and 480p image output methods, respectively, in the present embodiment, however, the present invention is not limited to this. The video output formats v1, v2 and v3 may include other image output methods.

Still further, the audio output formats a1, a2, a3 and a4 have 2 channels/16 bits/48 kHz, 8 channels/246 bits/192 kHz, Dolby Digital Plus, and Digital Theater System, respectively, in the present embodiment, however, the present invention is not limited to this. The audio output formats a1, a2, a3 and a4 may have other methods.

In addition, data is transmitted for all of the time slots S3 to SN indicated by the solid lines in the reservation period Tav in FIG. 3B, however, the present invention is not limited to this. When there is no data to be transmitted to the AV input buffer 23, data is not always transmitted for all of the time slots S3 to SN within the reservation period Tav.

Further, the random access period Tr is arranged to be subsequent to the beacon period Tb in FIG. 3, however, the present invention is not limited to this. The random access period Tr is not always subsequent to the beacon period but may be arranged between, for example, reservation periods Tav.

Second Embodiment

Figure 4:
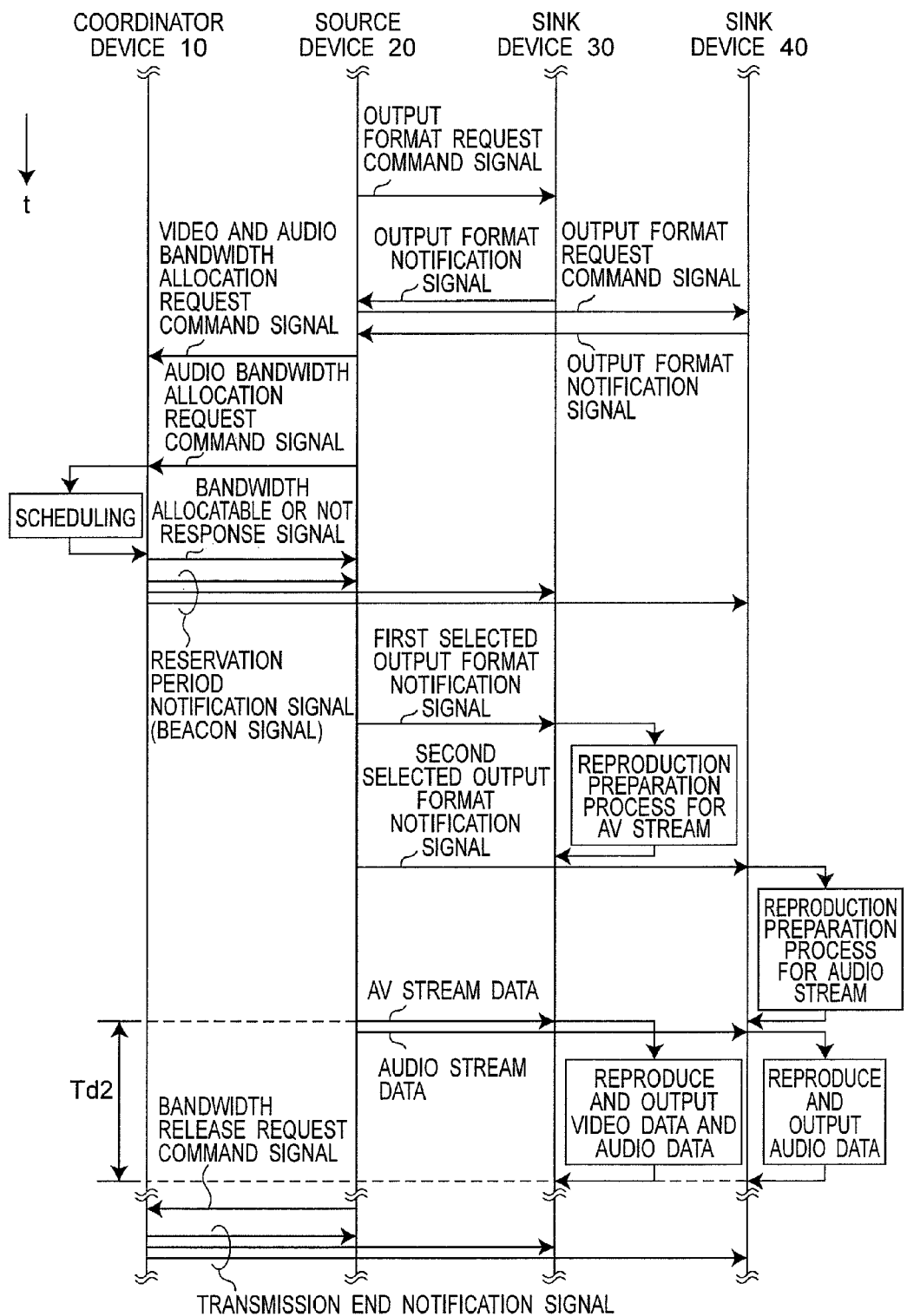
FIG. 4 is a sequence diagram showing a bandwidth allocation method for AV stream data according to a second embodiment of the present invention.
Figure 5A:
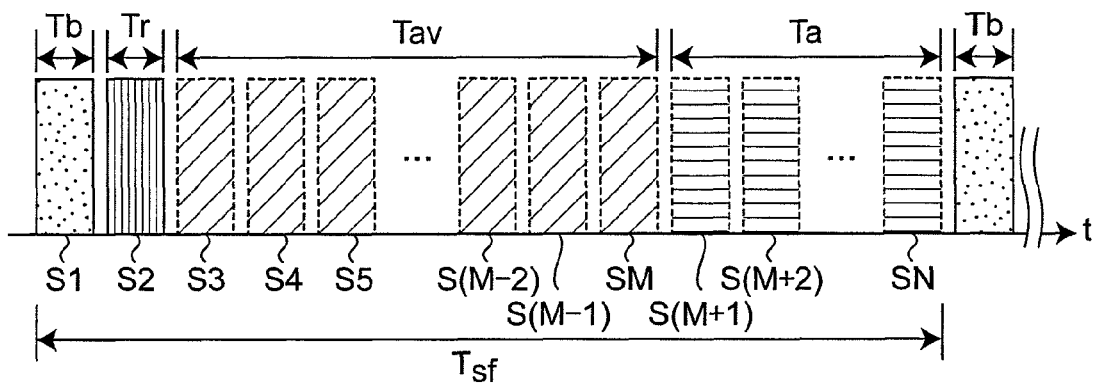
FIG. 5A is a timing chart showing the bandwidth allocation method for AV stream data according to the second embodiment of the present invention.
Figure 5B:
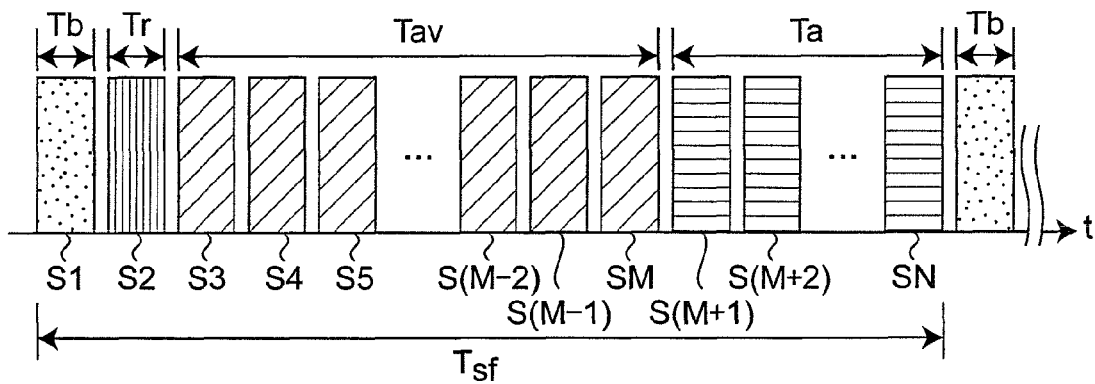
FIG. 5B is a timing chart showing a state of transmitting the AV stream data in a data transmission period Td2 of FIG. 4.

FIG. 4 is a sequence diagram showing a bandwidth allocation method for AV stream data according to a second embodiment of the present invention. In addition, FIG. 5A is a timing chart showing the bandwidth allocation method for AV stream data according to the second embodiment of the present invention, and FIG. 5B is a timing chart showing a state of transmitting the AV stream data in a data transmission period Td2 of FIG. 4. It is to be noted that the bandwidth allocation method for AV stream data of FIG. 5A is applied to a third embodiment.

The bandwidth allocation method for AV stream data according to the second embodiment is characterized as follows. In response to the video and audio bandwidth allocation request command signal and the audio bandwidth allocation request command signal from the source device 20, the coordinator device 10 allocates the reservation period Tav for transmitting the AV stream data from the source device 20 to the sink device 30 and a reservation period Ta for transmitting audio stream data from the source device 20 to the sink device 40 within the super frame period Tsf, and transmits a beacon signal including information on allocation of the reservation periods Tav and Ta.

The bandwidth allocation method for AV stream data according to the second embodiment of the present invention will be described below with reference to FIGS. 1, 4, 5A and 5B.

Referring to FIG. 5A, each super frame has the predetermined super frame period Tsf, and includes a plurality of N time slots S1, S2, . . . and SN each having a predetermined time period and a predetermined bandwidth amount. Further, each super frame includes, from top, the beacon period Tb including the time slot S1, the random access period Tr including the time slot S2, the reservation period Tav for transmitting the AV stream data from the source device 20 to the sink device 30, and the reservation period Ta for transmitting the audio stream data from the source device 20 to the sink device 40. In this case, the reservation period Tav includes a plurality of (M−2) time slots S3, S4, . . . , S(M−1) and SM, and the reservation period Ta includes a plurality of (N−M) time slots S(M+1), S(M+2), . . . and SN.

Referring to FIG. 4, first of all, in order to request the sink device 30 to transmit a plurality of video and audio output formats of video and audio data to be outputted from the sink device 30 to the display with loudspeaker 60, the source device 20 transmits the output format request command signal to the sink device 30 for the random access period Tr. In response to this, the sink device 30 transmits the output format notification signal including data on the video output formats v1, v2 and v3 and the audio output formats s1 and s2, to the source device 20 for the random access period Tr. Further, in order to request the sink device 40 to transmit a plurality of audio output formats of audio data to be outputted from the sink device 40 to the loudspeaker 70, the source device 20 transmits the output format request command signal to the sink device 40 for the random access period Tr. In response to this, the sink device 40 transmits the output format notification signal including data on the audio output formats a1, a2, a3 and a4 to the source device 20 for the random access period Tr.

Next, in response to the output format notification signal from the sink device 30, the source device 20 selects one video output format from among the video output formats v1, v2 and v3, and select one audio output format from among the audio output formats s1 and s2. Then, the source device 20 calculates a bandwidth amount required to transmit AV stream data having the selected video output format and audio output format based on the selected output formats. In addition, the source device 20 calculates the number of allocated time slots required to transmit the AV stream data based on the calculated required bandwidth amount and a bandwidth amount of each time slot. Then, the source device 20 transmits the video and audio bandwidth allocation request command signal, which includes information on the source device 20 of a originating device, information on the sink device 30 of a destination device, and the calculated number of allocated time slots to the coordinator device 10, for the random access period Tr.

Further, in response to the output format notification signal from the sink device 40, the source device 20 selects one audio output format from among the audio output formats a1, a2, a3 and a4. In addition, the source device 20 calculates a bandwidth amount required to transmit the audio stream data having the selected audio output formats based on the selected output format. For example, when the source device 20 selects the audio output format a2, a bandwidth amount required to transmit audio data having the audio output format a2 is about 37 Mbps (=192000×8×24). In addition, the source device 20 calculates the number of allocated time slots required to transmit the audio stream data based on the calculated required bandwidth amount and a bandwidth amount of each time slot. In addition, the source device 20 transmits the audio bandwidth allocation request command signal which includes information on the source device 20 of a originating device, information on the sink device 40 of a destination device, and the calculated number of allocated time slots to the coordinator device 10, for the random access period Tr.

Referring to FIG. 4, upon receiving the video and audio bandwidth allocation request command signal and the audio bandwidth allocation request command signal from the source device 20, the coordinator device 10 determines whether or not information on the originating device included in the respective signals are the same as each other. When the information are the same as each other, the coordinator device 10 performs scheduling so as to transmit the stream data from the originating device to a plurality of destination device substantially simultaneously. Concretely speaking, as shown in FIG. 5A, the coordinator device 10 allocates the reservation period Tav required to transmit the AV stream data from the source device 20 to the sink device 30 and the reservation period Ta required to transmit the audio stream data from the source device 20 to the sink device 40 within the super frame period Tsf. Further, the coordinator device 10 transmits the bandwidth allocatable or not response signal representing whether or not the reservation periods Tav and Ta are allocatable, to the source device 20. When the reservation periods Tav and Ta are allocatable, the coordinator device 10 transmits the reservation period notification signal including information on allocation of the reservation periods Tav and Ta to all of the devices in the wireless communication network using a beacon signal. In this case, the information on the allocation of the reservation periods Tav and Ta includes information on leading time slots of the reservation periods Tav and Ta, information on the number of time slots included in the respective reservation periods Tav and Ta, information on periods of the time slots, and information on a period of a schedule.

Upon receiving the reservation period notification signal, the source device 20 transmits the first selected output format notification signal for notifying the sink device 30 of the selected video and audio output formats to the sink device 30 for the random access period Tr. In response to this, the sink device 30 performs the reproduction preparation process for AV stream based on the notified video and audio output formats. In addition, the source device 20 transmits the second selected output fog mat notification signal for notifying the sink device 40 of the selected audio output format to the sink device 40 for the random access period Tr. In response to this, the sink device 40 performs an reproduction preparation process for audio stream such as a setting of audio output sampling to be executed before receiving the audio stream data based on the notified video and audio output formats.

After transmitting the first selected output format notification signal and the second selected output format notification signal, the source device 20 transmits the AV stream data to the sink device 30 for the reservation period Tav, and transmits the audio stream data to the sink device 40 for the reservation period Ta. Concretely speaking, in the data transmission period Td2 of FIG. 4, the source device 20 transmits the AV stream data to the sink device 30 using the time slots S3 to SM indicated by solid lines within the reservation period Tav of FIG. 5B, and the source device 20 transmits the audio stream data to the sink device 40 using the time slots S(M+1) to SN indicated by solid lines within the reservation period Ta of FIG. 5B. The sink device 30 reproduces video and audio data from the received AV stream data, and outputs the reproduced video and audio data to the display with loudspeaker 60. In addition, the sink device 40 reproduces audio data from the received audio stream data, and outputs the reproduced audio data to the loudspeaker 70.

After the transmission of the AV stream data from the source device 20 to the sink device 30 and the transmission of the audio stream data from the source device 20 to the sink device 40 are completed, each of the source device 20 and the sink devices 30 and 40 transmits the bandwidth release request command signal to the coordinator device 10 for the random access period Tr. In response to this, the coordinator device 10 performs the predetermined bandwidth release process, and transmits a beacon signal including the transmission end notification signal to all of the devices in the wireless communication network.

As described above in detail, according to the present embodiment, the coordinator device 10 performs the scheduling so as to allocate the reservation period Tav for transmitting the AV stream data from the source device 20 to the sink device 30 and the reservation period Ta for transmitting the audio stream data from the source device 20 to the sink device 40 within the super frame period Tsf. Therefore, stream data can be transmitted from one source device 20 to the two sink devices 30 and 40 substantially simultaneously, and it is possible to reduce a transmission time difference between the transmission of the AV stream data from the source device 20 to the sink device 30 and the transmission of the audio stream data from the source device 20 to the sink device 40, as compared with the prior art.

Third Embodiment

Figure 7:
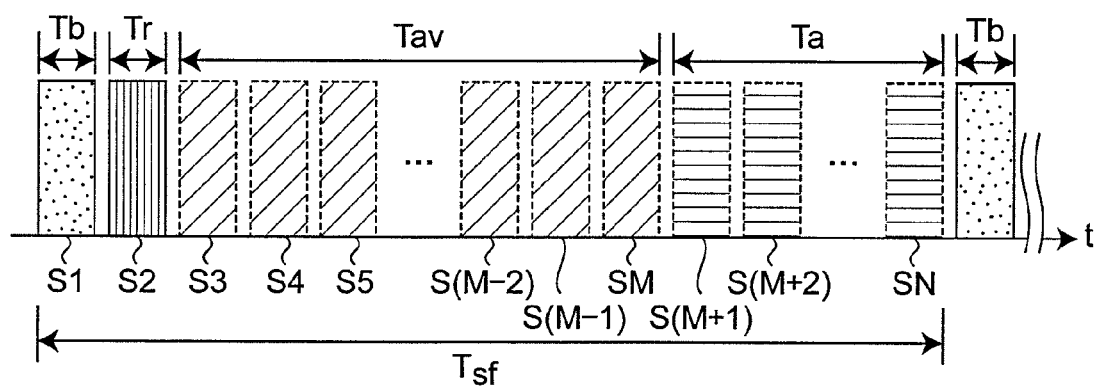
FIG. 7 is a timing chart showing the bandwidth allocation method for AV stream data according to the third embodiment of the present invention.
Figure 8:
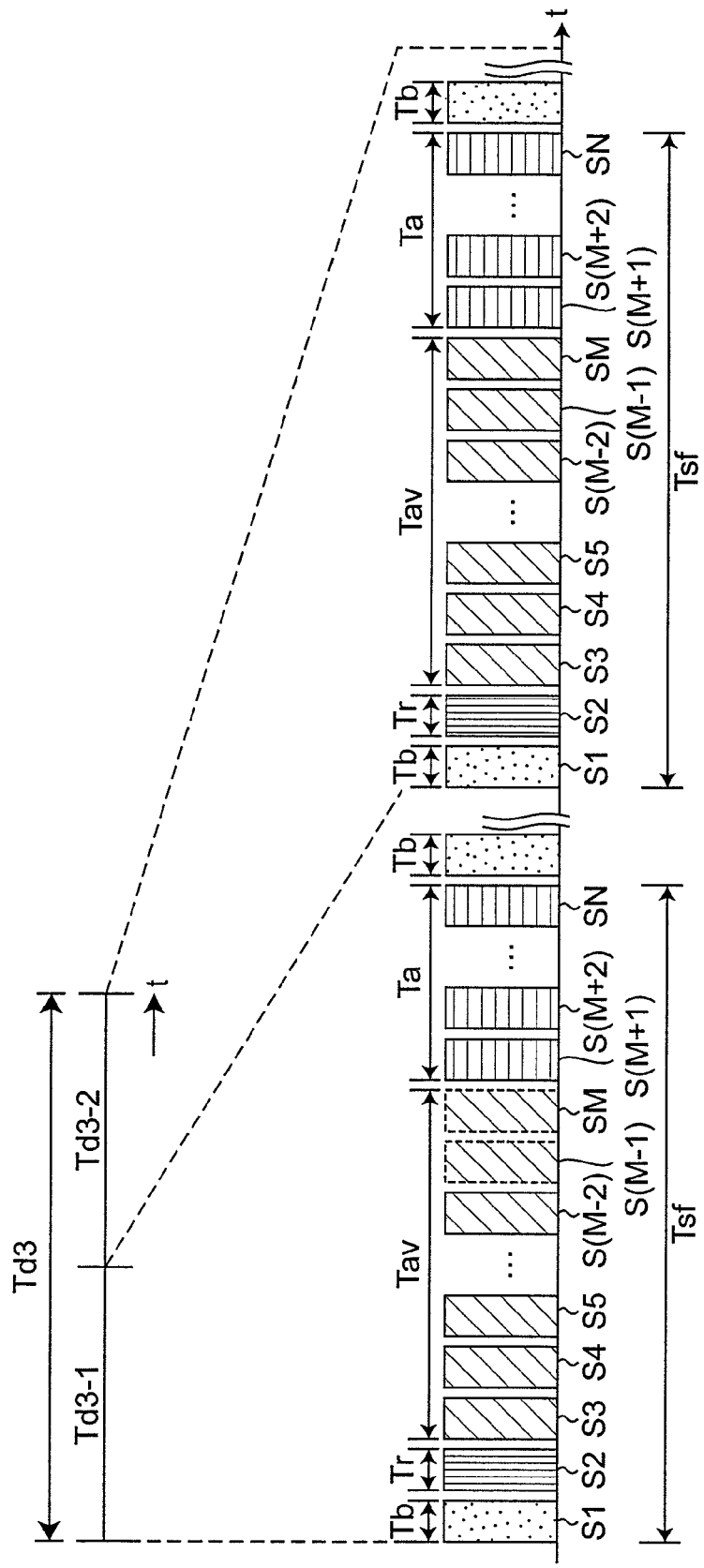
FIG. 8 is a timing chart showing a state of transmitting the AV stream data in a data transmission period Td3 of FIG. 6.

FIG. 6 is a sequence diagram showing a bandwidth allocation method for AV stream data according to a third embodiment of the present invention. In addition, FIG. 7 is a timing chart showing the bandwidth allocation method for AV stream data according to the third embodiment of the present invention, and FIG. 8 is a timing chart showing a state of transmitting the AV stream data in a data transmission period Td3 of FIG. 6. It is to be noted that FIG. 7 is the same as the timing chart (See FIG. 5A) showing the bandwidth allocation method for AV stream data according to the second embodiment.

The third embodiment is characterized as follows, as compared with the second embodiment. After receiving the beacon signal including the information on allocation of the reservation periods Tav and Ta, the source device 20 transmits video stream data to the sink device 30 for the reservation period Tav, and transmits audio stream data to the sink device 40 for the reservation period Ta. In addition, after transmitting the video stream data to the sink device 30 for the reservation period Tav within the frame period Tsf, the source device 20 transmits AV stream data to the sink device 30 for a next frame period next to the frame period Tsf.

There will be described below the bandwidth allocation method for AV stream data according to the third embodiment of the present invention with reference to FIGS. 1, 6, 7 and 8.

Referring to FIG. 6, the data transmission period Td2 of FIG. 4 is replaced by the data transmission period Td3. In this case, the data transmission period Td3 includes a data transmission period Td3-1 and a data transmission period Td3-2 subsequent to the data transmission period Td3-1. Referring to FIG. 6, only the data transmission period Td3 will be described below.

Referring to FIG. 6, after transmitting the first selected output format notification signal and the second selected output format notification signal, the source device 20 transmits the video stream data to the sink device 30, and transmits the audio stream data to the sink device 40 in the data transmission period Td3-1. Concretely speaking, as shown in FIG. 8, in the data transmission period Td3-1, the source device 20 transmits the video stream data to the sink device 30 using time slots S3 to S(M−2) indicated by solid lines within the reservation period Tav, and transmits the audio stream data to the sink device 40 using time slots S(M+1) to SN indicated by solid lines within the reservation period Ta. In this case, the reservation period Tav is allocated to transmit the AV stream from the source device 20 to the sink device 30. However, since the source device 20 transmits the video stream data, which has a bandwidth amount required for transmission smaller than that of the AV stream data, for the reservation period Tav in the data transmission period Td3-1, the time slots S(M−1) and SM indicated by broken lines within the reservation period Tav are not used for the data transmission.

Referring to FIG. 6, the sink device 30 reproduces video data from the received video stream data, and outputs the video data to the display with loudspeaker 60. In addition, the sink device 40 reproduces audio data from the received audio stream data, and outputs the audio data to the loudspeaker 70.

Next, in the data transmission period Td3-2, the source device 20 transmits AV stream data to the sink device 30 and transmits audio stream data to the sink device 40. Concretely speaking, as shown in FIG. 8, in the data transmission period Td3-2, the source device 20 transmits the AV stream data to the sink device 30 using the time slots S3 to SM indicated by the solid lines within the reservation period Tav. In addition, the source device 20 transmits the audio stream data to the sink device 40 using the time slots S(M+1) to SN indicated by the solid lines within the reservation period Ta. Referring to FIG. 6, the sink device 30 reproduces video data and audio data from the received audio stream data, and outputs the video data and the audio data to the display with loudspeaker 60. In addition, the sink device 40 reproduces audio data from the received audio stream data, and outputs the audio data to the loudspeaker 70.

As described above in detail, according to the present embodiment, the source device 20 requests the coordinator device 10 to allocate a bandwidth required to transmit the AV stream data, not depending on whether the source device 20 is to transmit the AV stream data or only the video stream, which has the bandwidth amount required for transmission smaller than that of the AV stream data to the sink device 30. In response to this, the coordinator device 10 performs the scheduling so as to allocate the reservation period Tav for transmitting the AV stream data from the source device 20 to the sink device 30 for every super frame. Therefore, even when the source device 20 transmits the AV stream data having a size larger than that of the video stream data to the sink device 30 after transmitting the video stream data, the coordinator device 10 does not need to perform scheduling for transmitting the AV stream data. Reproducing time for the sink device 30 to reproduce the video and audio data or the video data can be reduced as compared with the prior art.

In the present embodiment, after transmitting the video stream data to the sink device 30 for the reservation period Tav within one frame period Tsf, the source device 20 transmits the AV stream data to the sink device 30 for another frame period Tsf next to the frame period Tsf, however, the present invention is not limited to this. After transmitting the AV stream data to the sink device 30 for the reservation period Tav within one frame period Tsf, the source device 20 may transmit video stream data to the sink device 30 for another period Tsf next to the frame period Tsf.

Fourth Embodiment

Figure 9:
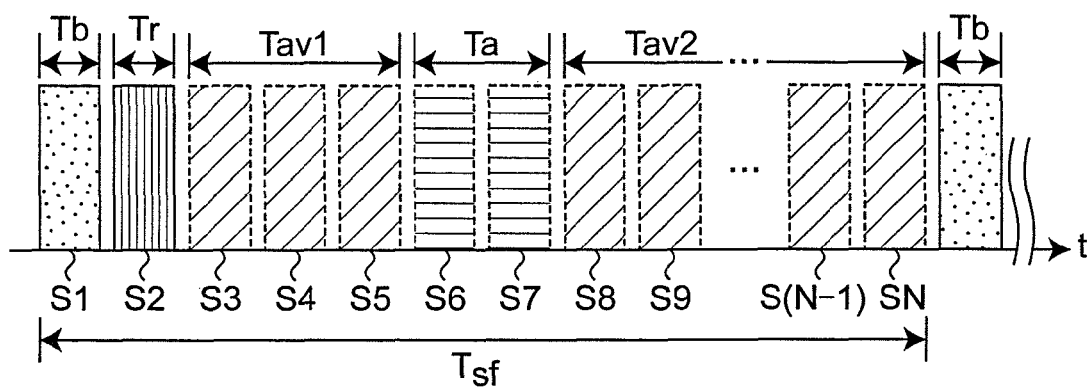
FIG. 9 is a timing chart showing a bandwidth allocation method for AV stream data according to a fourth embodiment of the present invention.

FIG. 9 is a timing chart showing a bandwidth allocation method for AV stream data according to the fourth embodiment of the present invention. As compared with the second embodiment, the bandwidth allocation method for AV stream data according to the fourth embodiment is characterized as follows. In the super frame period Tsf, the reservation period Tav for transmitting the AV stream data from the source device 20 to the sink device 30 is divided into two periods Tav1 and Tav2, and a reservation period Ta for transmitting audio stream data from the source device 20 to the sink device 40 is allocated between the two divided periods Tav1 and Tav2.

Referring to FIG. 9, each super frame has the predetermined super frame period Tsf, and includes a plurality of N time slots S1, S2, . . . and SN each having a predetermined time period and a predetermined bandwidth amount. In addition, each super frame includes, from top, the beacon period Tb including the time slot S1, the random access period Tr including the time slot S2, the reservation period Tav1 for transmitting the AV stream data from the source device 20 to the sink device 30, the reservation period Ta for transmitting the audio stream data from the source device 20 to the sink device 40, and the reservation period Tav2 for transmitting the AV stream data from the source device 20 to the sink device 30. In this case, the reservation period Tav1 includes three time slots S3, S4 and S5, the reservation period Ta includes two time slots S6 and S7, and the reservation period Tav2 includes a plurality of (N−7) time slots S8, S9, . . . and SN.

According to the present embodiment, it is possible to transmit stream data from one source device 20 to the two sink devices 30 and 40 substantially simultaneously, and it is possible to reduce a transmission time difference between transmission of the AV stream data or the video stream data from the source device 20 to the sink device 30 and transmission of the audio stream data from the source device 20 to the sink device 40, as compared with the prior art.

Referring to FIG. 9, the reservation periods Tav1, Ta and Tav2 include three time slots, two time slots, and (N−7) time slots, respectively, however, the present invention is not limited to this. Each reservation period may include at least one time slot.

Fifth Embodiment

Figure 10:
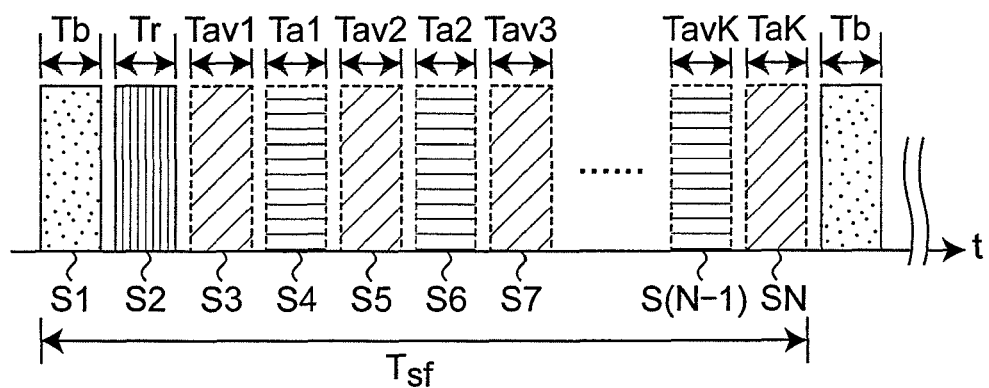
FIG. 10 is a timing chart showing a bandwidth allocation method for AV stream data according to a fifth embodiment of the present invention.

FIG. 10 is a timing chart showing a bandwidth allocation method for AV stream data according to the fifth embodiment of the present invention. As compared with the second embodiment, the bandwidth allocation method for AV stream data according to the fifth embodiment is characterized as follows. The reservation period Tav for transmitting AV stream data from the source device 20 to the sink device 30 is divided into a plurality of K divided reservation periods Tav1, Tav2, . . . and TavK, and the reservation period Ta for transmitting audio stream data from the source device 20 to the sink device 40 is divided into a plurality of K divided reservation periods Ta1, Ta2, . . . and TaK. In addition, the respective divided reservation periods Tav1, Tav2, . . . and TavK and the respective divided reservation periods Ta1, Ta2, . . . and TaK are allocated within the frame period Tsf so that the divided reservation periods Tav1, Tav2, . . . and TavK and the divided reservation periods Ta1, Ta2, and TaK are located alternately with each other.

Referring to FIG. 10, each super frame has the predetermined super frame period Tsf, and includes a plurality of N time slots S1, S2, . . . and SN each having a predetermined time period and a predetermined bandwidth amount. In addition, each super frame includes, from top, the beacon period Tb including the time slot S1, the random access period Tr including the time slot S2. Further, subsequent to the random access period Tr, each super frame includes the plurality of K divided reservation periods Tav1, Tav2, . . . and TavK for transmitting the AV stream data from the source device 20 to the sink device 30, and the plurality of K divided reservation periods Ta1, Ta2, . . . and TaK for transmitting the audio stream data from the source device 20 to the sink device 40. In this case, each of the reservation periods Tav1, Tav2, . . . and TavK, and Ta1, Ta2, . . . and TaK includes one time slot, and the reservation periods Tav1, Tav2, . . . and the reservation periods TavK and Ta1, Ta2, . . . and TaK are allocated alternately one by one.

FIGS. 19 and 20 are diagrams showing a first part and a second part of a table according to the fifth embodiment of the present invention, respectively, the table showing an example of concrete numeric values for bandwidth allocation in a super frame when the source device 20 transmits video stream data to the sink device 30 and the source device 20 transmits audio stream data to a sink device 40. As shown in FIGS. 19 and 20, a length of the super frame period Tsf is 20 ms, and a length of the beacon period Tb (Beacon) is 200 μs. In addition, time slots for transmitting the video stream data from the source device 20 to the sink device 30 are time slots CTB#1, CTB#3, CTB#5, . . . and CTB#27 (odd-numbered time slots among time slots CTB#1 to CTB#27), . . . and time slots CTB#30, CTB#32, CTB#34, . . . and CTB#56 (even-numbered time slots among time slots CTB#30 to CTB#56). In addition, time slots for transmitting the audio stream data from the source device 20 to the sink device 40 are time slots CTB#2, CTB#4, CTB#6, . . . and CTB#28 (even-numbered time slots among time slots CTB#1 to CTB#27), . . . and time slots CTB#31, CTB#33, CTB#35, . . . and CTB#57 (odd-numbered time slots among time slots CTB#31 to CTB#57). It is to be noted that the time slot CTB#29 is used for data RTT for copyright protection of contents transmitted between the source device 20 and the sink devices 30 and 40 or Beam search, which is first data for adjusting the antennas of the source device 20, the antennas of the sink device 30 and the antennas of the sink device 40.

In addition, referring to FIGS. 19 and 20, in each of the periods of the time slots CTB#1, CTB#3, CTB#5, . . . and CTB#27 and the time slots CTB#30, CTB#32, CTB#34, . . . and CTB#56 for transmitting the video stream data from the source device 20 to the sink device 30, it is possible to transmit packets 1 to 3 of three mixture packets. In this case, the packet 1 includes video data V and reserved Rsv, and the packet 2 includes video data V and reserved Rsv. In addition, the packet 3 includes video data V, reserved Rsv, and video data V or Beam track which is second data for adjusting the antennas.

Further, in each of the periods of the time slots CTB#2, CTB#6, CTB#8, CTB#12, CTB#14, CTB#18, CTB#20, CTB#24, CTB#26, CTB#31, CTB#35, CTB#37, CTB#41, CTB#43, CTB#47, CTB#49, CTB#53 and CTB#55 for transmitting the audio stream data from the source device 20 to the sink device 40, it is possible to transmit one packet 1, and the packet 1 includes audio data A. Still further, in each of the periods of the time slots CTB#4, CTB#10, CTB#16, CTB#22, CTB#28, CTB#33, CTB#39, CTB#45, CTB#51 and CTB#57 for transmitting the audio stream data from the source device 20 to the sink device 40, it is possible to transmit two packets 1 and 2. The packet 1 includes either only audio data A or the audio data A and Beam track which is second data for adjusting the antennas, and the packet 2 includes audio data A and reserved Rsv.

According to the present embodiment, it is possible to transmit stream data from one source device 20 to the two sink devices 30 and 40 substantially simultaneously, and it is possible to reduce a delay time difference between transmission of the AV stream data or the video stream data from the source device 20 to the sink device 30 and transmission of the audio stream data from the source device 20 to the sink device 40, as compared with the prior art.

Each of the divided reservation periods Tav1 to TavK and Ta1 to TaK includes one time slot in FIG. 10, however, each of the divided reservation periods Tav1 to TavK and Ta1 to TaK may include a plurality of time slots. In this case, the reservation periods Tav and Ta may be divided into divided reservation periods, respectively.

Sixth Embodiment

Figure 11:
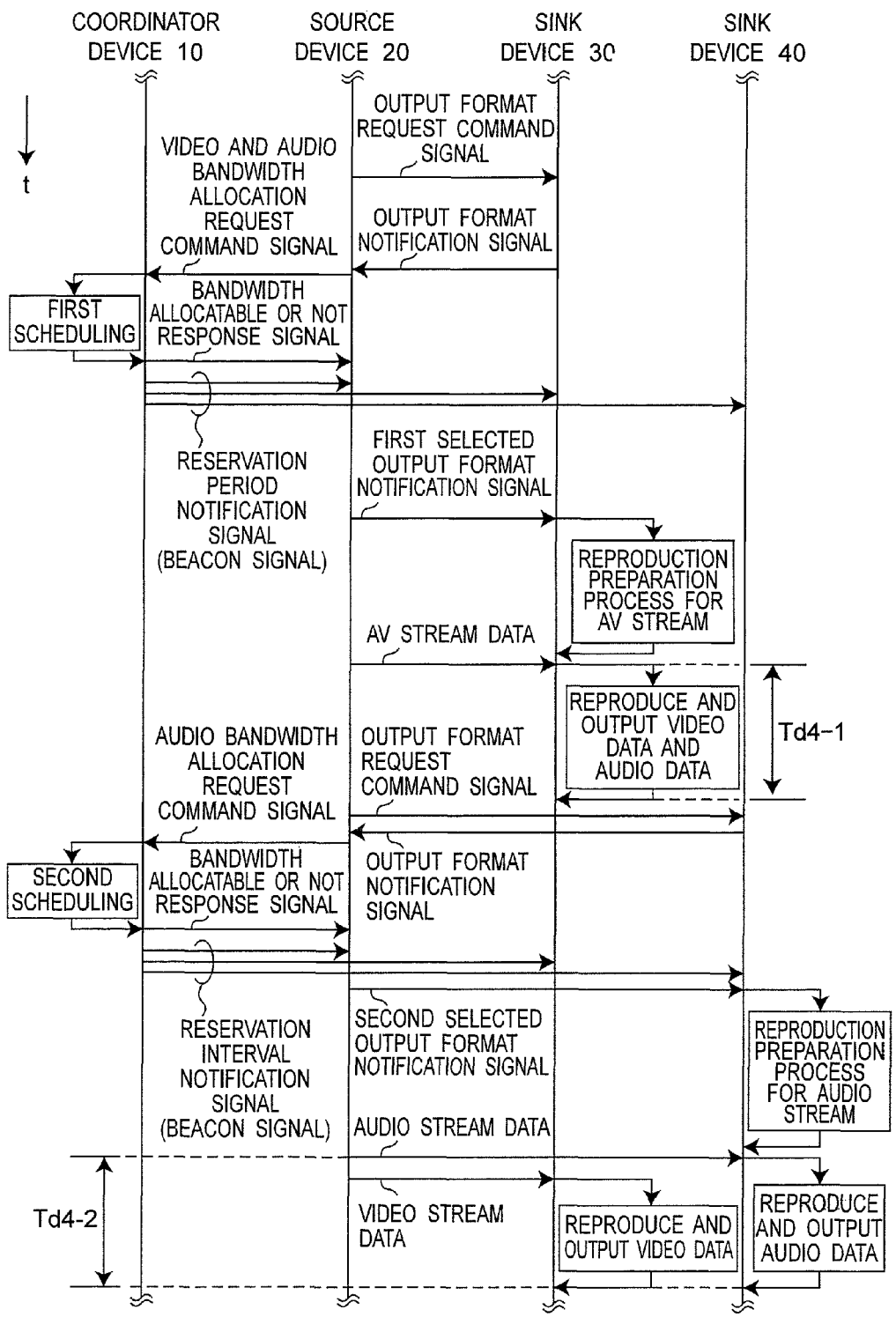
FIG. 11 is a sequence diagram showing a bandwidth allocation method for AV stream data according to a sixth embodiment of the present invention.
Figure 12A:
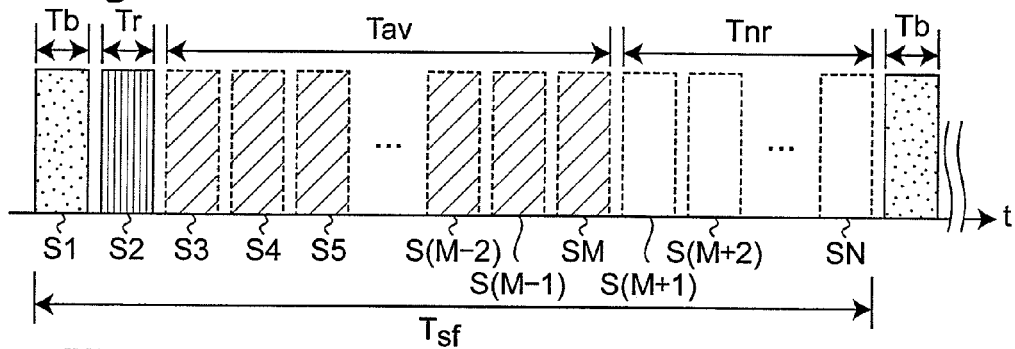
FIG. 12A is a timing chart showing a state of allocating a reservation period Tav in a first scheduling of FIG. 11.
Figure 12B:
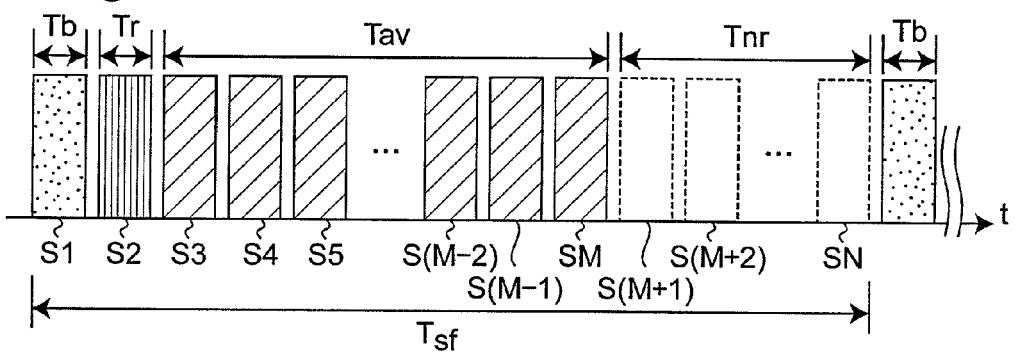
FIG. 12B is a timing chart showing a state of transmitting the AV stream data in a data transmission period Td4-1 of FIG. 11.
Figure 12C:
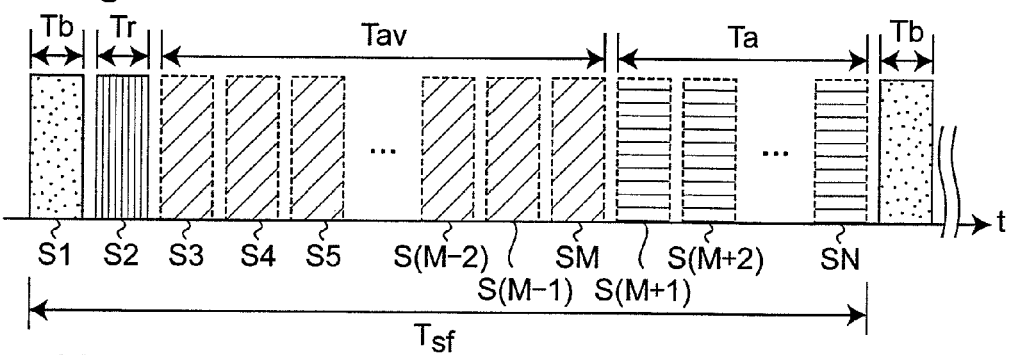
FIG. 12C is a timing chart showing a state of allocating reservation periods Tav and Ta in a second scheduling of FIG. 11.
Figure 12D:
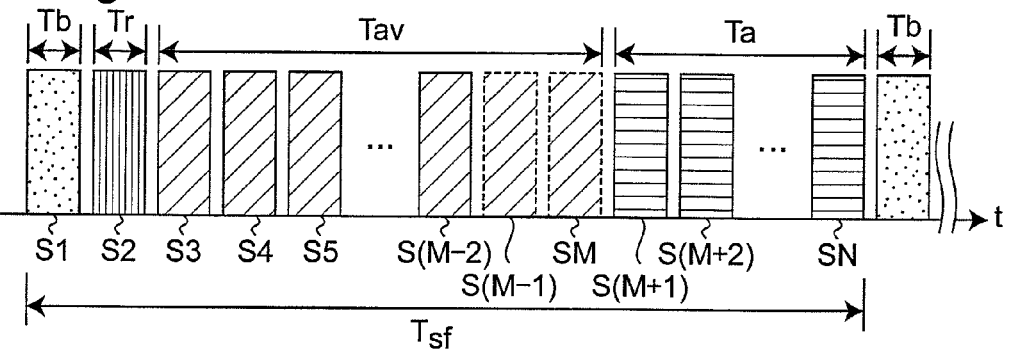
FIG. 12D is a timing chart showing a state of transmitting video stream data and audio stream data in a data transmission period Td4-2 of FIG. 11.

FIG. 11 is a sequence diagram showing a bandwidth allocation method for AV stream data according to the sixth embodiment of the present invention. In addition, FIG. 12A is a timing chart showing a state of allocating the reservation period Tav in a first scheduling of FIG. 11, FIG. 12B is a timing chart showing a state of transmitting the AV stream data in a data transmission period Td4-1 of FIG. 11, FIG. 12C is a timing chart showing a state of allocating reservation periods Tav and Ta in a second scheduling of FIG. 11, and FIG. 12D is a timing chart showing a state of transmitting video stream data and audio stream data in a data transmission period Td4-2 of FIG. 11. The bandwidth allocating method for AV stream data according to the sixth embodiment of the present invention will be described below with reference to FIGS. 1, 11, 12A, 12B, 12C and 12D.

Referring to FIG. 11, first of all, in order to request the sink device 30 to transmit a plurality of video and audio output formats of video and audio data to be outputted from the sink device 30 to the display with loudspeaker 60, the source device 20 transmits the output format request command signal to the sink device 30 for the random access period Tr. In response to this, the sink device 30 transmits the output format notification signal, which includes the data on the video output formats v1, v2 and v3 and the audio output formats s1 and s2, to the source device 20 for the random access period Tr. In response to this, the source device 20 selects one video output format from among the video output formats v1, v2 and v3, and select one audio output format from among the audio output formats s1 and s2. Then, the source device 20 calculates a bandwidth amount required to transmit AV stream data having the selected video output format and audio output format based on the selected output formats. In addition, the source device 20 calculates the number of allocated time slots required to transmit the AV stream data based on the calculated required bandwidth amount and a bandwidth amount of each time slot. Then, the source device 20 transmits the video and audio bandwidth allocation request command signal, which includes information on the source device 20 of a originating device, information on the sink device 30 of a destination device, and the calculated number of allocated time slots to the coordinator device 10 for the random access period Tr.

Referring to FIG. 11, upon receiving the video and audio bandwidth allocation request command signal from the source device 20, the coordinator device 10 allocates the reservation period Tav required to transmit the AV stream data from the source device 20 to the sink device 30 (the first scheduling of FIG. 11) as shown in FIG. 12A. In this case, the reservation period Tav includes time slots S3 . . . and SM, and an period Tnr which is not allocated for data transmission includes time slots S(M+1), S(M+2), . . . and SN. Further, the coordinator device 10 transmits the bandwidth allocatable or not response signal representing whether or not the reservation period Tav is allocatable, to the source device 20. Further, when the reservation period Tav is allocatable, the coordinator device 10 transmits the reservation period notification signal, which includes information on allocation of the reservation period Tav including information on a leading time slot of the reservation period Tav and the number of time slots included in the reservation period Tav, information on a period of each time slot, and an period of a schedule, to all of the devices in the wireless communication network using a beacon signal.

Upon receiving the reservation period notification signal, the source device 20 transmits the first selected output format notification signal for notifying the sink device 30 of the selected video and audio output formats to the sink device 30 for the random access period Tr. In response to this, the sink device 30 performs the reproduction preparation process for AV stream based on the notified video and audio output formats. In addition, after transmitting the first selected output format notification signal, the source device 20 transmits the AV stream data to the sink device 30 for the data transmission period Td4-1 of FIG. 11. In this case, as shown in FIG. 12B, the source device 20 transmits the AV stream data to the sink device 30 using the time slots S3 to SM indicated by solid lines within the reservation period Tav. In addition, the sink device 30 reproduces video and audio data from the received AV stream data, and outputs the reproduced video and audio data to the display with loudspeaker 60.

Next, in order to request the sink device 40 to transmit a plurality of audio output formats of audio data to be outputted from the sink device 40 to the loudspeaker 70, the source device 20 transmits the output format request command signal to the sink device 40 for the random access period Tr. In response to this, the sink device 40 transmits the output format notification signal including data on the audio output formats a1, a2, a3 and a4 to the source device 20 for the random access period Tr.

Further, in response to the output format notification signal from the sink device 40, the source device 20 selects audio output format from among the audio output formats a1, a2, a3 and a4. In addition, the source device 20 calculates a bandwidth amount required to transmit the audio stream data having the selected audio output format based on the selected output format. Next, the source device 20 calculates the number of allocated time slots required to transmit the audio stream data based on the calculated required bandwidth amount and a bandwidth amount of each time slot. In addition, the source device 20 transmits the audio bandwidth allocation request command signal, which includes information on the source device 20 of an originating device, information on the sink device 40 of a destination device, and the calculated number of allocated time slots to the coordinator device 10 for the random access period Tr.

Referring to FIG. 11, upon receiving the audio bandwidth allocation request command signal from the source device 20, the coordinator device 10 allocates the period Tnr, which is not reserved for data transmission in the first scheduling, to a reservation period Ta required to transmit the audio stream data from the source device 20 to the sink device 40 (the second scheduling of FIG. 11) as shown in FIG. 12C. Further, the coordinator device 10 transmits the bandwidth allocatable or not response signal representing whether or not the reservation period Ta is allocatable, to the source device 20. Further, when the reservation period Ta is allocatable, the coordinator device 10 transmits the reservation period notification signal, which includes information on allocation of the reservation period Ta including information on a leading time slot of the reservation period Ta and the number of time slots included in the reservation period Ta, information on a period of each time slot, and an period of a schedule, to all of the devices in the wireless communication network using a beacon signal. In response to this, the source device 20 transmits the second selected output format notification signal for notifying the sink device 40 of the selected audio output format to the sink device 40 for the random access period Tr. In response to this, the sink device 40 performs the reproduction preparation process for audio stream such as a setting of audio output sampling to be executed before receiving the audio stream data based on the notified video and audio output formats.

After transmitting the second selected output format notification signal, the source device 20 transmits video stream data to the sink device 30 and transmits audio stream data to the sink device 40 for the data transmission period Td4-2 of FIG. 11. Concretely speaking, as shown in FIG. 12D, for the data transmission period Td4-2 of FIG. 11, the source device 20 transmits the video stream data to the sink device 30 using the time slots S3 to S(M−2) indicated by solid lines within the reservation period Tav, and the source device 20 transmits the audio stream data to the sink device 40 using the time slots S(M+1) to SN indicated by solid lines within the reservation period Ta. In this case, the reservation period Tav is allocated for transmitting the AV stream data from the source device 20 to the sink device 30, and the video stream data is transmitted for the data transmission period Td4-2. When the video stream data is transmitted, it requires a bandwidth amount smaller than that of the AV stream data. Therefore, in the time slots S(M−1) and SM indicated by broken lines within the reservation period Tav, no data is transmitted.

In addition, referring to FIG. 11, the sink device 30 reproduces video data from the received video stream data, and outputs the reproduced video data to the display with loudspeaker 60. In addition, the sink device 40 reproduces audio data from the received audio stream data, and outputs the audio data to the loudspeaker 70.

According to the present embodiment, first of all, in order to transmit the AV stream data to the sink device 30, the source device 20 transmits the video and audio bandwidth allocation request signal for requesting the reservation period for transmitting the AV stream data, to the coordinator device 10. In response to this, the coordinator device 10 transmits the beacon signal including the reservation period Tav (the first scheduling of FIG. 11). In response to this, the source device 20 transmits the AV stream data to the sink device 30 for the reservation period Tav. Then, in order to transmit the video stream data to the sink device 30 and to transmit the audio stream data to the sink device 40, the source device 20 transmits the audio bandwidth allocation request signal for requesting the reservation period for transmitting the audio stream data from the source device 20 to the sink device 40, to the coordinator device 10. In this case, the source device 20 does not transmit any bandwidth allocation request signal for requesting a reservation period for transmitting the video stream data to the sink device 30, to the coordinator device 10. In response to this, the coordinator device 10 allocates the reservation period Ta to the period Tnr, which is not allocated for transmission of stream data, for every super frame (the second scheduling of FIG. 11), and transmits the beacon signal including the reservation period notification signal, which includes information on allocation of the reservation periods Ta and Tav. In response to this, the source device 20 transmits the video stream data to the sink device for the reservation period Tav, and transmits the audio stream data to the sink device 40 for the reservation period Ta.

Therefore, according to the present embodiment, when data transmitted from the source device 20 to the sink device 30 is changed from the AV stream data to the video stream data having a size smaller than that of the AV stream data, the source device 20 does not transmits any bandwidth allocation request signal for requesting the reservation period for transmitting the video stream data to the sink device 30, to the coordinator device 10. Namely, there is no need to make a re-reservation of a bandwidth for transmitting data from the source device 20 to the sink device 30. As compared with the prior art, in the sink device 30, it is possible to reduce reproduction time for the AV stream data or the video stream data transmitted from the source device 20.

Seventh Embodiment

Figure 14A:
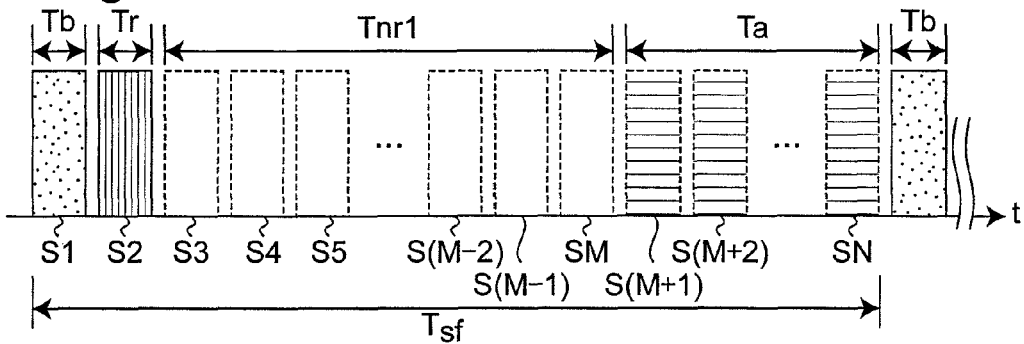
FIG. 14A is a timing chart showing a state of allocating a reservation period Ta in a first scheduling of FIG. 13.
Figure 14B:
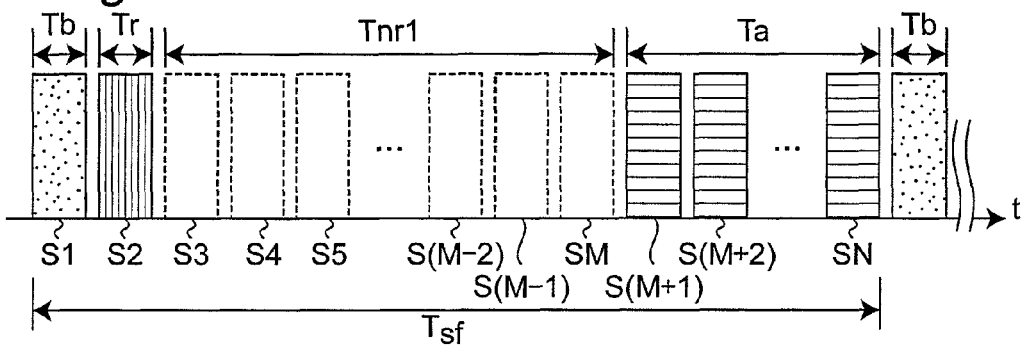
FIG. 14B is a timing chart showing a state of transmitting audio stream data in a data transmission period Td5-1 of FIG. 13.
Figure 14C:
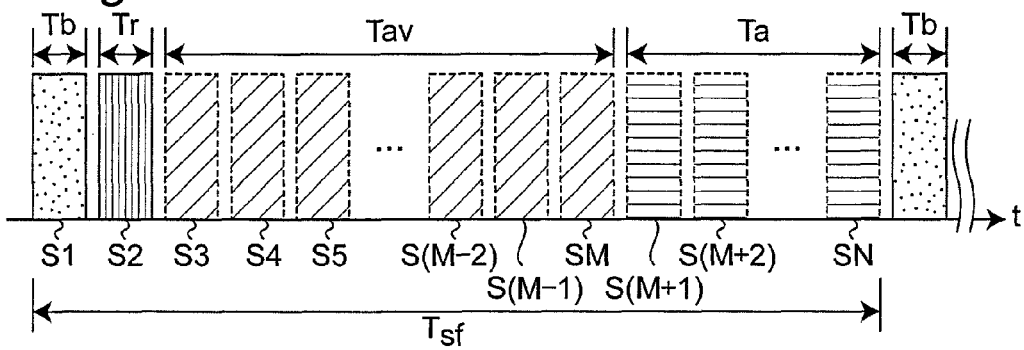
FIG. 14C is a timing chart showing a state of allocating reservation periods Tav and Ta in a second scheduling of FIG. 13.
Figure 14D:
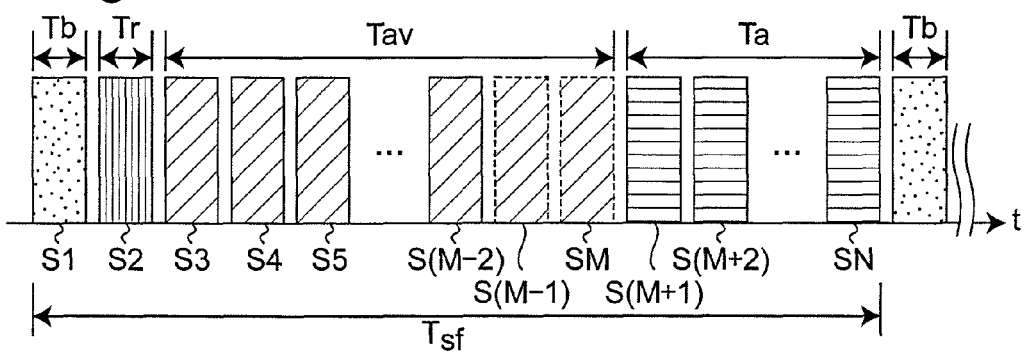
FIG. 14D is a timing chart showing a state of transmitting video stream data and audio stream data in a data transmission period Td5-2 of FIG. 13.
Figure 15:
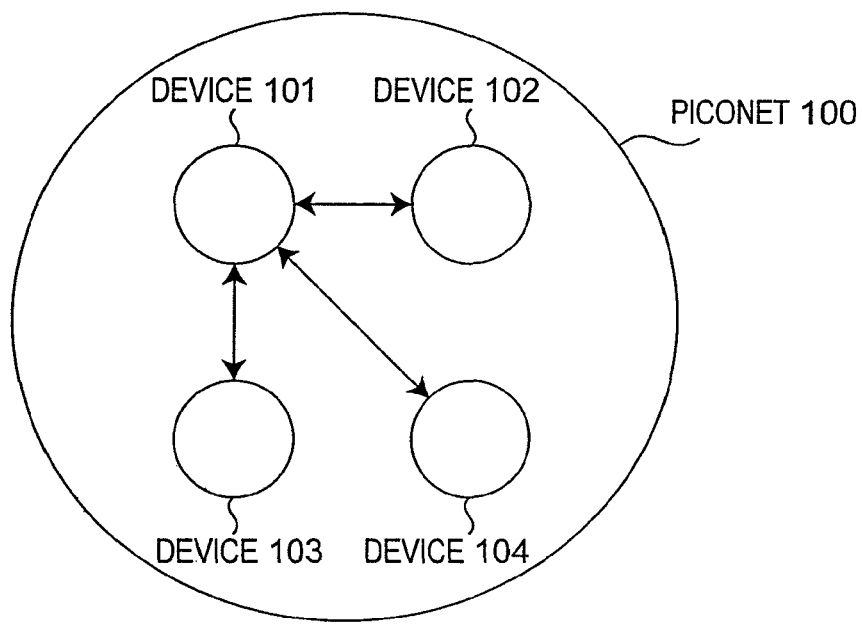
FIG. 15 is a block diagram showing an example of IEEE 802.15.3 network using an UWB (Ultra Wide Band) according to a prior art.

FIG. 13 is a sequence diagram showing a bandwidth allocation method for AV stream data according to the seventh embodiment of the present invention. In addition, FIG. 14A is a timing chart showing a state of allocating the reservation period Tav in a first scheduling of FIG. 13, FIG. 14B is a timing chart showing a state of transmitting audio stream data in a data transmission period Td5-1 of FIG. 13, FIG. 14C is a timing chart showing a state of allocating reservation periods Tav and Ta in a second scheduling of FIG. 13, and FIG. 14D is a timing chart showing a state of transmitting video stream data and audio stream data in a data transmission period Td5-2 of FIG. 13. The bandwidth allocating method for AV stream data according to the seventh embodiment of the present invention will be described below with reference to FIGS. 1, 13, 14A, 14B, 14C and 14D.

Referring to FIG. 13, first of all, in order to request the sink device 40 to transmit a plurality of audio output formats of audio data to be outputted from the sink device 40 to the loudspeaker 70, the source device 20 transmits the output format request command signal to the sink device 40 for the random access period Tr. In response to this, the sink device 40 transmits the output format notification signal including data on the audio output formats a1, a2, a3 and a4 to the source device 20 for the random access period Tr.

Further, in response to the output format notification signal from the sink device 40, the source device 20 selects one audio output format from among the audio output formats a1, a2, a3 and a4. Then, the source device 20 calculates a bandwidth amount required to transmit the audio stream data having the selected audio output format based on the selected output format. Next, the source device 20 calculates the number of allocated time slots required to transmit the audio stream data based on the calculated required bandwidth amount and a bandwidth amount of each time slot. Then, the source device 20 transmits the audio bandwidth allocation request command signal, which includes information on the source device 20 of an originating device, information on the sink device 40 of a destination device, and the calculated number of allocated time slots, to the coordinator device 10 for the random access period Tr.

Referring to FIG. 13, upon receiving the audio bandwidth allocation request command signal from the source device 20, the coordinator device 10 allocates a reservation period Ta required to transmit the audio stream data from the source device 20 to the sink device 40 (the first scheduling of FIG. 13) as shown in FIG. 14A. In this case, the reservation period Ta includes time slots S(M+1), S(M+2), . . . and SN, and an period Tnr1 which is not allocated for data transmission includes time slots S3, S4, . . . and SM. Further, the coordinator device 10 transmits the bandwidth allocatable or not response signal representing whether or not the reservation period Ta is allocatable, to the source device 20. When the reservation period Ta is allocatable, the coordinator device 10 transmits the reservation period notification signal, which includes information on allocation of the reservation period Ta including information on a leading time slot of the reservation period Ta and the number of time slots included in the reservation period Ta, information on a period of each time slot, and an period of a schedule, to all of the devices in the wireless communication network using a beacon signal. In response to this, the source device 20 transmits the second selected output format notification signal for notifying the sink device 40 of the selected audio output format to the sink device 40 for the random access period Tr. In response to this, the sink device 40 performs the reproduction preparation process for audio stream such as a setting of audio output sampling to be executed before receiving the audio stream data based on the notified video and audio output formats.

After transmitting the second selected output format notification signal, the source device 20 transmits the audio stream data to the sink device 40 for the data transmission period Td5-1 of FIG. 13. Concretely speaking, as shown in FIG. 14B, the source device 20 transmits the audio stream data to the sink device 40 using the time slots S(M+1) to SN indicated by solid lines within the reservation period Ta. In addition, the sink device 40 reproduces audio data from the received audio stream data, and outputs the audio data to the loudspeaker 70.

Next, in order to request the sink device 30 to transmit a plurality of video and audio output formats of video and audio data to be outputted from the sink device 30 to the display with loudspeaker 60, the source device 20 transmits the output format request command signal to the sink device 30 for the random access period Tr. In response to this, the sink device 30 transmits the output format notification signal including data on the video output formats v1, v2 and v3 and the audio output formats s1 and s2, to the source device 20 for the random access period Tr. In response to this, the source device 20 selects one video output format from among the video output formats v1, v2 and v3, and selects one audio output format from among the audio output formats s1 and s2. In addition, the source device 20 calculates a bandwidth amount required to transmit AV stream data having the selected video output format and audio output format based on the selected output formats. In addition, the source device 20 calculates the number of allocated time slots required to transmit the AV stream data based on the calculated required bandwidth amount and a bandwidth amount of each time slot. In addition, the source device 20 transmits the video and audio bandwidth allocation request command signal, which includes information on the source device 20 of an originating device, information on the sink device 30 of a destination device, and the calculated number of allocated time slots, to the coordinator device 10 for the random access period Tr.

Referring to FIG. 13, upon receiving the video and audio bandwidth allocation request command signal from the source device 20, the coordinator device 10 allocates the period Tnr1 which is not reserved for data transmission in the first scheduling to the reservation period Tav required to transmit the AV stream data from the source device 20 to the sink device 30 (the second scheduling of FIG. 13) as shown in FIG. 14C. In addition, the coordinator device 10 transmits the bandwidth allocatable or not response signal representing whether or not the reservation period Tav is allocatable, to the source device 20. Further, when the reservation period Tav is allocatable, the coordinator device 10 transmits the reservation period notification signal, which includes information on allocation of the reservation period Tav including information on a leading time slot of the reservation period Tav and the number of time slots included in the reservation period Tav, information on a period of each time slot, and an period of a schedule, to all of the devices in the wireless communication network using a beacon signal.

Upon receiving the reservation period notification signal, the source device 20 transmits the first selected output format notification signal for notifying the sink device 30 of the selected video and audio output formats to the sink device 30 for the random access period Tr. In response to this, the sink device 30 performs the reproduction preparation process for AV stream based on the notified video and audio output formats.

After transmitting the first selected output formats notification, the source device 20 transmits video stream data to the sink device 30 and audio stream data to the sink device 40 for a data transmission period Td5-2 of FIG. 13. Concretely speaking, as shown in FIG. 14D, the source device 20 transmits the video stream data to the sink device 30 using the time slots S3 to S(M−2) indicated by solid lines within the reservation period Tav in the data transmission period Td5-2 of FIG. 13. In addition, the source device 20 transmits the audio stream data to the sink device 40 using the time slots S(M+1) to SN indicated by solid lines within the reservation period Ta in the data transmission period Td5-2 of FIG. 13. In this case, the reservation period Tav is allocated for transmitting the AV stream from the source device 20 to the sink device 30, and the video stream data is transmitted for the data transmission period Td5-2. When the video stream data is transmitted, it requires a bandwidth amount smaller than that of the AV stream data. Therefore, in the time slots S(M−1) and SM indicated by broken lines within the reservation period Tav, no data is transmitted. The sink device 30 reproduces video data from the received video stream data, and outputs the reproduced video data to the display with loudspeaker 60. In addition, the sink device 40 reproduces audio data from the received audio stream data, and outputs the reproduced audio data to the loudspeaker 70.

According to the present embodiment, first of all, in order to transmit the audio stream data to the sink device 40, the source device 20 transmits the audio bandwidth allocation request signal for requesting the reservation period for transmitting the audio stream data to the sink device 40, to the coordinator device 10. In response to this, the coordinator device 10 transmits the beacon signal including the reservation period notification signal, which includes the information on the allocation of the reservation period Ta (the first scheduling of FIG. 13). In response to this, the source device 20 transmits the audio stream data to the sink device 40 for the reservation period Ta. Then, in order to transmit the video stream data to the sink device 30 and the audio stream data to the sink device 40, the source device 20 transmits the video and audio bandwidth allocation request signal for requesting the reservation period for transmitting the AV stream data from the source device 20 to the sink device 30, to the coordinator device 10. In response to this, the coordinator device 10 allocates the reservation period Tav to the period Tnr1 which is not allocated for transmission of stream data (the second scheduling of FIG. 13), and transmits the beacon signal including the reservation period notification signal which includes the information on the allocation of the reservation periods Ta and Tav. In response to this, the source device 20 transmits the video stream data to the sink device 30 for the reservation period Tav, and transmits the audio stream data to the sink device 40 for the reservation period Ta.

Namely, according to the present embodiment, when the source device 20 further transmits data to the sink device 30 when transmitting the audio stream data to the sink device 40, the source device 20 transmits the video and audio bandwidth allocation request signal for requesting the reservation period for transmitting the AV stream data from the source device 20 to the sink device 30, to the coordinator device 10. Then, the source device 20 transmits the video stream data to the sink device 20, and transmits the audio stream data to the sink device 30. Therefore, according to the present embodiment, in a manner similar to that of the third embodiment, even when the source device 20 transmits the AV stream data having a size larger than that of the video stream data to the sink device 30 after transmitting the video stream data, the coordinator device 10 is not required to perform scheduling for transmitting the AV stream data. Therefore, it is possible to reduce reproducing time for the sink device 30 to reproduce the video and audio data or the video data, as compared with the prior art.

In the respective embodiments described above, each of the sink devices 30 and 40 transmits the output format notification signal for notifying the source device 20 of data on a plurality of video output formats and a plurality of audio output formats to the source device 20, in response to the output format request command from the source device 20, however, the present invention is not limited to this. Each of the sink devices 30 and 40 may transmit output format notification signal for notifying the source device 20 of the data on a plurality of video output fog mats and a plurality of audio output formats, to the source device 20 at a predetermined timing without awaiting the output format request command signals from the source device 20. In addition, each of the sink devices 30 and 40 may transmit the output format notification signal to the source device 20 via the coordinator device 10.

In addition, in the respective embodiments described above, the coordinator 10 is provided separately from the source device 20 and the sink devices 30 and 40, however, the present invention is not limited to this. The source device 20 or the sink devices 30 or 40 may include the coordinator device 10.

Further, in the respective embodiments described above, the source device 20 is configured to be separated from the audio and visual reproducing device 50, however, the present invention is not limited to this. The source device 20 may be configured to be integrated with the audio and visual reproducing device 50.

Still further, in the respective embodiments described above, the sink device 30 is configured to be separated from the display with loudspeaker 60, however, the present invention is not limited to this. The sink device 30 may be configured to be integrated with the display with loudspeaker 60.

In addition, in the respective embodiments described above, the sink device 40 is configured to be separated from the loudspeaker 70, however, the present invention is not limited to this. The sink device 40 may be configured to be integrated with the loudspeaker 70.

Further, in the respective embodiments described above, the source device 20 calculates a quantity of allocated time slots required to transmit the AV stream data having the selected video and audio output formats based on the output formats, and transmits the video and audio bandwidth allocation request command signal including the quantity of allocated time slots to the coordinator device 10. In addition, the source device 20 calculates a quantity of allocated time slots required to transmit the audio stream data having the selected audio output format based on the output formats, and transmits the audio bandwidth allocation request command signal including the quantity of allocated time slots to the coordinator device 10. However, the present invention is not limited to this. The source device 20 may transmit a signal including data on the selected video output format and audio output format to the coordinator device 10, and the coordinator device 10 may calculate the number of allocated time slots required to transmit the stream data having the output formats in response to the signal.

In addition, in the respective embodiments described above, after the competition of the transmission of the AV stream data from the source device 20 to the sink device 30 or after the competition of the transmission of the audio stream data from the source device 20 to the sink device 40, the source device 20 transmits the bandwidth release request command signal to the coordinator device 10 for the random access period Tr, however, the present invention is not limited to this. The sink device 30 or 40 may transmit the bandwidth release request command signal.

Further, in the respective embodiments described above, after the competition of the AV stream data from the source device 20 to the sink device 30 or the competition of the transmission of the audio stream data from the source device 20 to the sink device 40, the source device 20 transmits the bandwidth release request command signal to the coordinator device 10 for the random access period Tr and the coordinator device 10 transmits the transmission end notification signal. However, the present invention is not limited to this, and this sequence may be omitted.

Still further, in the respective embodiments described above, the source device 20 transmits the AV stream data to the sink device 30, however, the present invention is not limited to this. The source device 20 may transmit audio stream data to the sink device 30. In addition, in the respective embodiments described above, the source device 20 transmits the audio stream data to the sink device 40, however, the present invention is not limited to this. The source device 20 may transmit AV stream data to the sink device 40.

In addition, in the respective embodiments described above, the wireless communication network includes one source device 30 and the two sink devices 30 and 40, however, the present invention is not limited to this. The wireless communication network may include at least one source device and at least one sink device.

Further, in the second to seventh embodiments described above, after receiving the first selected output format notification signal from the source device 20, the sink device 30 performs the reproduction preparation process for AV stream. In addition, after receiving the second selected output format notification signal from the source device 20, the sink device 40 performs the reproduction preparation process for audio stream. However, the present invention is not limited to this. In a manner similar to that of the first embodiment, the sink device 30 may predict video and audio output formats and perform the reproduction preparation process for AV stream before receiving the first selected output format notification signal from the source device 20, in response to the reservation period notification signal from the coordinator device 10. In addition, the sink device 40 may predict audio output format before receiving the second selected output format notification signal from the source device 20 and pedal the reproduction preparation process for audio stream, in response to the reservation period notification signal from the coordinator device 10

Still further, the bandwidth allocation method for AV stream data according to the fourth or fifth embodiment may be applied to each of the second, third, sixth and seventh embodiments.

INDUSTRIAL APPLICABILITY

As described above in detail, according to the bandwidth allocation method for use in the wireless communication system according to the first invention and the wireless communication system according to the third invention, a source device transmits a first bandwidth allocation request signal for requesting allocation of a bandwidth for transmitting a first stream data including audio and video data to the first sink device, and a second bandwidth allocation request signal for requesting allocation of a bandwidth for transmitting a second stream data including audio data to the second sink device, to the bandwidth management means. In response to the first and second bandwidth allocation request signals, the bandwidth management means allocates a first reservation period for transmitting the first stream data from the source device to the first sink device and a second reservation period for transmitting the second stream data from the source device to the second sink device within a predetermined frame period, and transmits a beacon signal including information on allocation of the first and second reservation periods. Therefore, one source device can transmit the first and second stream data to the first and second sink devices substantially simultaneously. In addition, as compared with the prior art, it is possible to reduce a transmission time difference between transmission of the first stream data from the source device to the first sink device and transmission of the second stream data from the source device to the second sink device.

In addition, according to the bandwidth allocation method for use in the wireless communication system according to the second invention and the wireless communication system according to the fourth invention, a source device receives an output format notification signal including data on a plurality of output formats transmitted from a sink device, selects output formats for outputting video and audio data via the sink device from among received plurality of output formats, and thereafter, transmits a bandwidth allocation request signal to bandwidth management means. The bandwidth allocation request signal is transmitted for requesting allocation of a bandwidth for transmitting stream data including video and audio data having selected output formats to the sink device. In response to this, the bandwidth management means transmits a beacon signal including information on a reservation period for transmitting the stream data from the source device to the sink device. Further, the sink device predicts the selected output formats by comparing the information on the reservation period included in the beacon signal with stored plurality of output formats. Therefore, as compared with the prior art, it is possible to reduce a total required time since the source device transmits the stream data to the sink device until the sink device reproduces contents of the stream data.

The invention claimed is:

1. A bandwidth allocation method for use in a wireless communication system, the wireless communication system including a source device and a bandwidth management device for managing a bandwidth for wireless transmission, the wireless communication system wirelessly transmitting one of (a) first stream data including video and audio data and (b) second stream data including video data from the source device to a first sink device, and wirelessly transmitting third stream data including audio data from the source device to a second sink device, the bandwidth allocation method comprising:

receiving, via the source device, a first output format notification signal transmitted from the first sink device;

receiving, via the source device, a second output format notification signal transmitted from the second sink device;

in response to the source device receiving the first output format notification signal transmitted from the first sink device, transmitting, via the source device, a first bandwidth allocation request signal for requesting allocation of a bandwidth for transmitting the first stream data to the first sink device, to the bandwidth management device;

in response to the source device receiving the second output format notification signal transmitted from the second sink device, transmitting, via the source device, a second bandwidth allocation request signal for requesting allocation of a bandwidth for transmitting the third stream data to the second sink device, to the bandwidth management device;

determining, in response to the first and second bandwidth allocation request signals and via the bandwidth management device, whether or not the first and second bandwidth allocation request signals originated from a same source device; and when said determining determines that the first and second bandwidth allocation request signals have originated from the same source device and via the bandwidth management device, allocating a first reservation period for transmitting the first stream data from the source device to the first sink device and a second reservation period for transmitting the third stream data from the source device to the second sink device within a predetermined one frame period, and transmitting a beacon signal including information of the allocation of the first and second reservation periods.

2. The bandwidth allocation method for use in the wireless communication system as claimed in claim 1, wherein the bandwidth allocation method further includes, after the source device receives the beacon signal including the information of the allocation, transmitting, via the source device, the second stream data to the first sink device for an allocated first reservation period, and transmitting the third stream data to the second sink device for an allocated second reservation period.

3. The bandwidth allocation method for use in the wireless communication system as claimed in claim 1, wherein the bandwidth allocation method further includes, after the source device receives the beacon signal, transmitting, via the source device, one stream data of the first and second stream data to the first sink device for the first reservation period allocated within the frame period, and transmitting another stream data of the first and second stream data to the first sink device for the first reservation period allocated within a next frame period next to the frame period.

4. The bandwidth allocation method for use in the wireless communication system as claimed in claim 1, wherein the bandwidth allocation method further includes dividing, via the bandwidth management device, the first reservation period into two periods, and allocating, via the bandwidth management device, the second reservation period between divided two periods.

5. The bandwidth allocation method for use in the wireless communication system as claimed in claim 1, wherein the bandwidth allocation method further includes dividing, via the bandwidth management device, the first reservation period into a plurality of first divided periods, dividing, via the bandwidth management device, the second reservation period into a plurality of second divided periods, and allocating, via the bandwidth management device, respective first divided periods and respective second divided periods within the frame period so that the first divided periods and the second divided periods are located alternately with each other.

6. The bandwidth allocation method for use in the wireless communication system as claimed in claim 1, wherein the bandwidth allocation method further includes, in response to the first bandwidth allocation request signal, allocating, via the bandwidth management device, the first reservation period within the predetermined one frame period, and transmitting, via the bandwidth management device, a first beacon signal including information of the allocation of the first reservation period, wherein the bandwidth allocation method further includes, after the source device receives the first beacon signal, transmitting, via the source device, the first stream data to the first sink device for the first reservation period within the frame period, and thereafter, transmitting, via the source device, the second bandwidth allocation request signal to the bandwidth management device, wherein the bandwidth allocation method further includes, in response to the second bandwidth allocation request signal, allocating, via the bandwidth management device, the second reservation period within a next frame period next to the frame period, and transmitting, via the bandwidth management device, a second beacon signal including information of the allocation of the second reservation period, and wherein the bandwidth allocation method further includes, after the source device receives the second beacon signal, transmitting, via the source device, the second stream data to the first sink device for an allocated first reservation period, and transmitting, via the source device, the third stream data to the second sink device for an allocated second reservation period.

7. The bandwidth allocation method for use in the wireless communication system as claimed in claim 1, wherein the bandwidth allocation method further includes, in response to the second bandwidth allocation request signal, allocating, via the bandwidth management device, the second reservation period within the predetermined one frame period, and transmitting, via the bandwidth management device, a first beacon signal including information of the allocation of the second reservation period, wherein the bandwidth allocation method further includes, after the source device receives the second beacon signal, transmitting, via the source device, the third stream data to the second sink device for the second reservation period within the frame period, and thereafter, transmitting, via the source device, the first bandwidth allocation request signal to the bandwidth management device, wherein the bandwidth allocation method further includes, in response to the first bandwidth allocation request signal, allocating, via the bandwidth management device, the first reservation period within a next frame period next to the frame period, and transmitting, via the bandwidth management device, a second beacon signal including information of the allocation of the first reservation period, and wherein the bandwidth allocation method further includes, after the source device receives the second beacon signal, transmitting, via the source device, the second stream data to the first sink device for the allocated first reservation period, and transmitting, via the source device, the third stream data to the second sink device for the allocated second reservation period.

8. A wireless communication system for wirelessly transmitting one of (a) first stream data including video and audio data and (b) second stream data including video data from a source device to a first sink device, and for wirelessly transmitting third stream data including audio data from the source device to a second sink device, the wireless communication system comprising:

a bandwidth management device for managing a bandwidth for wireless transmissions;
the source device;
the first sink device; and
the second sink device, wherein the source device receives a first output format notification signal transmitted from the first sink device, wherein the source device receives a second output format notification signal transmitted from the second sink device, wherein, in response to receiving the first output format notification signal, the source device transmits a first bandwidth allocation request signal for requesting allocation of a bandwidth for transmitting the first stream data to the first sink device, to the bandwidth management device, wherein, in response to receiving the second output format notification signal, the source device transmits a second bandwidth allocation request signal for requesting allocation of a bandwidth for transmitting the third stream data to the second sink device, to the bandwidth management device, wherein, in response to the first and second bandwidth allocation request signals, the bandwidth management device determines whether or not the first and second bandwidth allocation request signals originated from a same source device, and wherein, when the bandwidth management device determines that the first and second bandwidth allocation request signals have originated from the same source device, the bandwidth management device allocates a first reservation period for transmitting the first stream data from the source device to the first sink device and a second reservation period for transmitting the third stream data from the source device to the second sink device within a predetermined one frame period, and transmits a beacon signal including information of the allocation of the first and second reservation periods.

9. The wireless communication system as claimed in claim 8, wherein, after receiving the beacon signal including the information of the allocation, the source device transmits the second stream data to the first sink device for an allocated first reservation period, and transmits the third stream data to the second sink device for an allocated second reservation period.

10. The wireless communication system as claimed in claim 8, wherein, after receiving the beacon signal, the source device transmits one stream data of the first and second stream data to the first sink device for the first reservation period allocated within the frame period, and transmits another stream data of the first and second stream data to the first sink device for the first reservation period allocated within a next frame period next to the frame period.

11. The wireless communication system as claimed in claim 8, wherein the bandwidth management device divides the first reservation period into two periods, and allocates the second reservation period between the divided two periods.

12. The wireless communication system as claimed in claim 8, wherein the bandwidth management device divides the first reservation period into a plurality of first divided periods, divides the second reservation period into a plurality of second divided periods, and allocates the respective first divided periods and the respective second divided periods within the frame period so that the first divided periods and the second divided periods are located alternately with each other.

13. The wireless communication system as claimed in claim 8,
- wherein, in response to the first bandwidth allocation request signal, the bandwidth management device, allocates the first reservation period within the predetermined one frame period, and transmits a first beacon signal including information of the allocation of the first reservation period,
- wherein, after receiving the first beacon signal, the source device transmits the first stream data to the first sink device for the first reservation period within the frame period, and thereafter, transmits the second bandwidth allocation request signal to the bandwidth management device,
- wherein, in response to the second bandwidth allocation request signal, the bandwidth management device further allocates the second reservation period within a next frame period next to the frame period, and transmits a second beacon signal including information of the allocation of the second reservation period, and
- wherein, after receiving the second beacon signal, the source device transmits the second stream data to the first sink device for an allocated first reservation period, and transmits the third stream data to the second sink device for an allocated second reservation period.

14. The wireless communication system as claimed in claim 8,
- wherein, in response to the second bandwidth allocation request signal, the bandwidth management device allocates the second reservation period within the predetermined one frame period, and transmits a first beacon signal including information of the allocation of the second reservation period,
- wherein, after receiving the second beacon signal, the source device transmits the third stream data to the second sink device for the second reservation period within the frame period, and thereafter, transmits the first bandwidth allocation request signal to the bandwidth management device,
- wherein, in response to the first bandwidth allocation request signal, the bandwidth management device further allocates the first reservation period within a next frame period next to the frame period, and transmits a second beacon signal including information of the allocation of the first reservation period, and
- wherein, after receiving the second beacon signal, the source device transmits the second stream data to the first sink device for the allocated first reservation period, and transmits the third stream data to the second sink device for the allocated second reservation period.

15. A wireless communication system including a bandwidth management device and a source device, the wireless communication system for wirelessly transmitting one of (a) first stream data including video and audio data and (b) second stream data including video data from the source device to a first sink device, and for wirelessly transmitting third stream data including audio data from the source device to a second sink device, the bandwidth management device managing a bandwidth for wireless transmission,
- wherein the source device receives a first output format notification signal transmitted from the first sink device,
- wherein the source device receives a second output format notification signal transmitted from the second sink device,
- wherein, in response to receiving the first output format notification signal, the source device transmits a first bandwidth allocation request signal for requesting allocation of a bandwidth for transmitting the first stream data to the first sink device, to the bandwidth management device,
- wherein, in response to receiving the second output format notification signal, the source device transmits a second bandwidth allocation request signal for requesting allocation of a bandwidth for transmitting the third stream data to the second sink device, to the bandwidth management device,
- wherein, in response to the first and second bandwidth allocation request signals, the bandwidth management device determines whether or not the first and second bandwidth allocation request signals originated from a same source device, and
- wherein, when the bandwidth management device determines that the first and second bandwidth allocation request signals have originated from the same source device, the bandwidth management device allocates a first reservation period for transmitting the first stream data from the source device to the first sink device and a second reservation period for transmitting the third stream data from the source device to the second sink device within a predetermined one frame period, and transmits a beacon signal including information of the allocation of the first and second reservation periods.

\* \* \* \* \*